United States Patent
Jang et al.

(10) Patent No.: US 11,641,237 B2
(45) Date of Patent: May 2, 2023

(54) METHOD AND APPARATUS FOR TRANSMITTING PPDU ON BASIS OF S-TDMA IN WIRELESS LAN SYSTEM

(71) Applicant: LG ELECTRONICS INC., Seoul (KR)

(72) Inventors: Insun Jang, Seoul (KR); Suhwook Kim, Seoul (KR); Jeongki Kim, Seoul (KR); Kiseon Ryu, Seoul (KR); Taewon Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 16/978,175

(22) PCT Filed: Mar. 26, 2019

(86) PCT No.: PCT/KR2019/003475
§ 371 (c)(1),
(2) Date: Sep. 3, 2020

(87) PCT Pub. No.: WO2019/190150
PCT Pub. Date: Oct. 3, 2019

(65) Prior Publication Data
US 2021/0050914 A1    Feb. 18, 2021

(30) Foreign Application Priority Data

Mar. 26, 2018  (KR) .................. 10-2018-0034679

(51) Int. Cl.
*H04B 7/26* (2006.01)
*H04W 72/04* (2023.01)
*H04W 84/12* (2009.01)

(52) U.S. Cl.
CPC .......... *H04B 7/2656* (2013.01); *H04W 72/04* (2013.01); *H04W 84/12* (2013.01)

(58) Field of Classification Search
CPC .... H04B 7/2656; H04W 72/04; H04W 84/12; H04L 65/40; H04L 27/26
(Continued)

(56) References Cited

U.S. PATENT DOCUMENTS

2019/0254046 A1* 8/2019 Mori ................. H04L 5/0044

FOREIGN PATENT DOCUMENTS

| KR | 2016/190578 | * 12/2016 |
| WO | 2016/028112 |   2/2016  |

(Continued)

OTHER PUBLICATIONS

PCT International Application No. PCT/KR2019/003475, International Search Report dated Jun. 26, 2019, 2 pages.
(Continued)

*Primary Examiner* — Kwang B Yao
*Assistant Examiner* — Syed M Bokhari
(74) *Attorney, Agent, or Firm* — Lee Hong Degerman Kang Waimey

(57) ABSTRACT

A method and apparatus for transmitting a PPDU on the basis of S-TDMA in a wireless LAN system are presented. In particular, an AP generates a PPDU, and transmits the PPDU to a first STA and a second STA. When a PPDU further comprises a third signal field, the third signal field comprises information about S-TDMA. The information about S-TDMA comprises STDMA indication information indicating that S-TDMA can be carried out, first symbol offset information about a first data field, and second symbol offset information about a second data field. The S-TDMA indication information comprises information indicating that the first and second data fields are assigned to a first RU. The
(Continued)

first data field is transmitted from the first RU during a first symbol determined on the basis of the first symbol offset information. The second data field is transmitted from the first RU during a second symbol determined on the basis of the second symbol offset information.

15 Claims, 23 Drawing Sheets

(58) Field of Classification Search
USPC .................................................. 370/337
See application file for complete search history.

(56) References Cited

FOREIGN PATENT DOCUMENTS

| WO | 2016/190578 | 12/2016 |
|----|-------------|---------|
| WO | 2017/030342 | 2/2017 |

OTHER PUBLICATIONS

Lin et al., "acPad: Enhancing Channel Utilization for 802.11ac Using Packet Padding," IEEE INFOCOM 2017-IEEE Conference on Computer Communications, Oct. 5, 2017, 11 pages.
Lanante et al., "Considerations on UL MU Resource Scheduling," IEEE 802.11-15/0377r0, Mar. 2015, 16 pages.

\* cited by examiner

FIG. 1
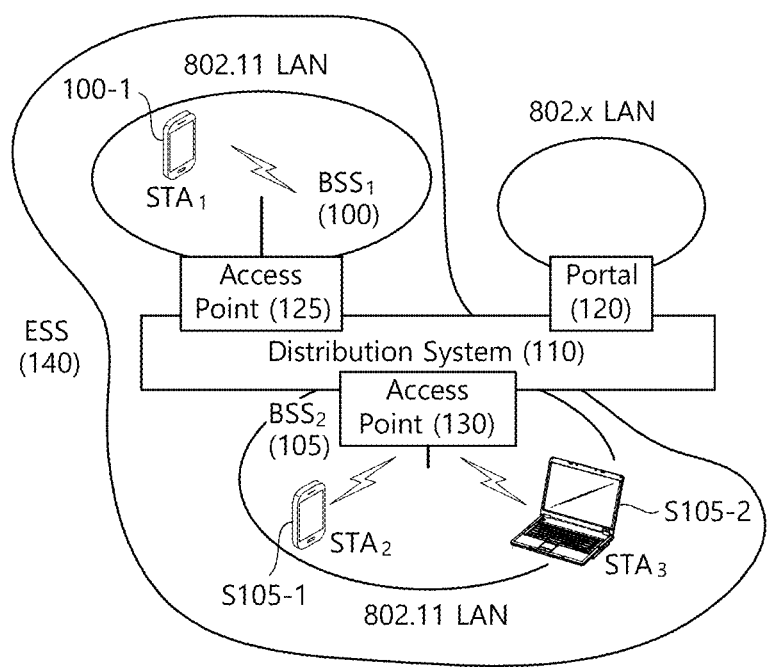
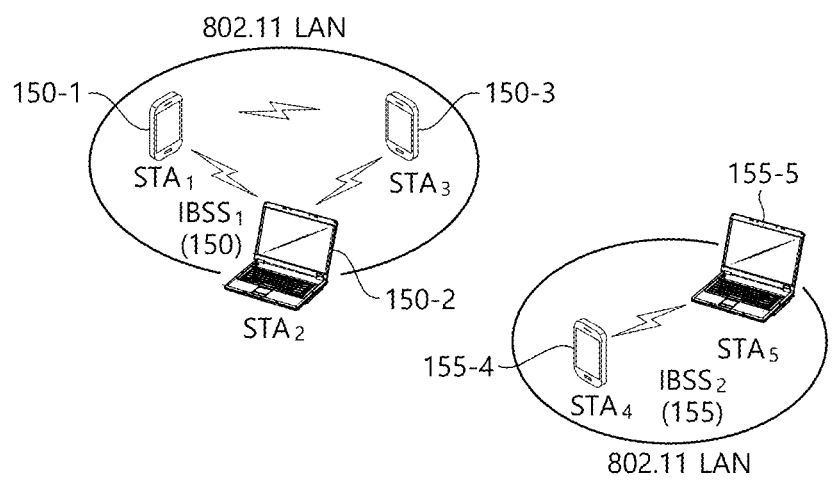

FIG. 15

| Legacy PHY header (e.g., L-STF, L-SIG, LR-SIG) | S-TMDA SIG-A | S-TMDA SIG-B | S-TMDA SIG-C | S-TMDA STF | S-TMDA LTF | Data (STA 1) | S-TMDA A-STF | S-TMDA A-LTF | Data (STA 2) |

FIG. 16

| Legacy PHY header (e.g., L-STF, L-LTF, L-SIG, LR-SIG) | S-TMDA SIG-A (HE-SIG-A) | S-TMDA SIG-B (HE-SIG-B) | S-TMDA SIG-C | S-TMDA STF (HE-STF) | S-TMDA LTF (HE-LTF) | Data (STA 1) | S-TMDA A-STF (HE-STF) | S-TMDA A-LTF (HE-LTF) | Data (STA 2) |

METHOD AND APPARATUS FOR TRANSMITTING PPDU ON BASIS OF S-TDMA IN WIRELESS LAN SYSTEM

CROSS-REFERENCE TO RELATED APPLICATIONS

This application is the National Stage filing under 35 U.S.C. 371 of International Application No. PCT/KR2019/003475, filed on Mar. 26, 2019, which claims the benefit of earlier filing date and right of priority to Korean Patent Application No. 10-2018-0034679, filed on Mar. 26, 2018, the contents of which are all hereby incorporated by reference herein in their entirety.

BACKGROUND OF THE DISCLOSURE

Field of the disclosure

The present disclosure relates to a scheme for performing S-TDMA in a wireless LAN system and, most particularly, to a method and device for transmitting a PPDU by using an S-TDMA scheme in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

This specification proposes a method and device for transmitting a PPDU by using an S-TDMA scheme in a wireless LAN system.

Technical Solutions

An example of this specification proposes a method for transmitting/receiving a PPDU based on S-TDMA.

This embodiment may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field, HE-SIG-B field, HE-STF field, and HE-LTF field may all be PPDU and fields that are defined in the 802.11ax system. S-TDMA MU PPDU, S-TDMA SIG-A field (first signal field), S-TDMA SIG-B field (second signal field), S-TDMA STF, and S-TDMA LTF may be PPDU and fields that are defined for performing S-TDMA in a next generation wireless LAN system. S-TDMA SIG-C field (third signal field) may be a signal field that is newly defined for performing S-TDMA in a next generation wireless LAN system. However, the PPDU and fields that are defined for performing S-TDMA may be generated by using each subfield of the HE PPDU without any modification in order to satisfy backward compatibility with the 802.11ax system.

This embodiment may be performed in a transmitting device, and the transmitting device may correspond to an AP. A receiving device may correspond to a (non-AP STA) STA having S-TDMA capability.

An access point (AP) generates the PPDU.

The AP transmits the PPDU to a first station (STA) and a second STA. The PPDU may be an S-TDMA MU PPDU, which may be newly defined in a next generation wireless LAN system. Additionally, the PPDU may be generated by using a High Efficiency Multi User PPDU (HE MU PPDU). That is, the PPDU may be an S-TDMA MU PPDU, which is generated by reusing the HE MU PPDU.

The PPDU includes a legacy header field, a first signal field, a second signal field, a first data field for the first STA, and a second data field for the second STA.

The legacy header field may be related to Legacy-Short Training Field (L-STF), Legacy-Long Training Field (L-LTF), Legacy-Signal (L-SIG) field, or Repeated Legacy-Signal (RL-SIG) field, which are included in the HE MU PPDU.

The first signal field may be related to the HE-SIG-A field, which is included in the HE MU PPDU. Since the first signal field is defined for performing S-TDMA operations, this field may be referred to as an S-TDMA SIG-A field.

The second signal field may be related to the HE-SIG-B field, which is included in the HE MU PPDU. Since the second signal field is defined for performing S-TDMA operations, this field may be referred to as an S-TDMA SIG-B field.

The first data field and the second data field may be related to downlink (DL) data, which applies S-TDMA being scheduled to the same RU while considering the time domain.

The second signal field includes information on Resource Unit (RU) layout and information on a number of STAs using the first RU. The information on RU layout and the information on the number of STAs using the first RU may be an 8-bit RU allocation subfield for RU allocation, as shown in Table 9. The information on RU layout and the information on the number of STAs using the first RU may be included in a common field of the second signal field.

That is, the first STA or second STA may decode the second signal field so as to know the RU layout within the whole frequency band and the number of STAs using each RU being included in RU layout. At this point, the number of STAs using the first RU may be equal to 2 or more. This is because S-TDMA is a scheme in which two or more STAs transmit/receive data fields from one RU.

In case a third signal field is further included in the PPDU, the third signal field includes information on the S-TDMA. The information on the S-TDMA includes S-TDMA indication information on that the S-TDMA may be performed, first symbol offset information for the first data field, and second symbol offset information for the second data field. According to the above-described embodiment, a third signal field is additionally inserted in the PPDU, thereby generating an S-TMDA MU PPDU. Since the third signal field is newly defined for performing S-TDMA operations, the third signal field may be referred to as an S-TDMA SIG-C field.

The S-TDMA indication information includes information on that the first and second data fields are being allocated to the first RU. That is, the first STA or the second STA decodes the S-TDMA indication information so as to verify that the first STA or the second STA is using the first RU and that the first STA or the second STA is being allocated with its data field in the first RU via S-TDMA.

The first data field is transmitted in the first RU during a first symbol, which is determined by the first symbol offset information. The second data field is transmitted in the first RU during a second symbol, which is determined by the second symbol offset information.

For example, the first symbol offset information may include information on a transmission start point of the first data field. The second symbol offset information may include information on a transmission start point of the second data field (in case the symbol offset information is a Starting Symbol offset). The first symbol and the second symbol may be positioned by TDMA in the first RU. The second symbol may be positioned immediately after the first symbol. Additionally, the first symbol may be positioned immediately after the second symbol.

As another example, the first symbol offset information may include information on a transmission end point of the first data field. The second symbol offset information may include information on a transmission end point of the second data field (in case the symbol offset information is an Ending Symbol offset). The first symbol and the second symbol may be positioned by TDMA in the first RU. The information on S-TDMA may further include End of S-TDMA information for a data field being last transmitted in the first RU. If the transmission end point of a data field is only known, since it is difficult to determine whether or not a data field is being last transmitted from the corresponding RU, information on that the corresponding data field is being last transmitted may be notified through the End of S-TDMA information by using an additional bit.

In case a third signal field is not included in the PPDU, the second signal field may further include the information on S-TDMA. At this point, the information on RU layout and the information on the number of STAs using the first RU may be included in a common field of the second signal field. The information on S-TDMA may be included in a user field of the second signal field.

The PPDU may further include a Short Training Field (STF) and Long Training Field (LTF) for the first STA and an STF (S-TDMA A-STF) and LTF (S-TDMA A-LTF) for the second STA. That is, not only the STF and LTF for the first STA being allocated in the first RU but also the STF and LTF for the second STA being allocated in the first RU may be added. The STF and LTF for the second STA may be transmitted after the first data field and before the second data field. A guard time may be included between the first data field and the STF and LTF for the second STA.

Additionally, the AP may transmit the PPDU to a third STA. The PPDU may further include a third data field for the third STA. The third data field may be transmitted in a second RU, which is determined based on the second signal field. The first RU and the second RU are different frequency bands. That is, the third data field indicates that it may be received based on OFDMA.

Hereinafter, in case a third signal field is not included in the PPDU, the embodiment in which the second signal field includes the information on S-TDMA will be described in detail. Additionally, the embodiment in which the PPDU reuses a HE MU PPDU will be described in detail.

For example, the first signal field may include an additional bit indicating whether or not an S-TDMA MU PPDU includes a third signal field, and STF and LTF for a second STA (additional STF and LTF). According to the above-described assumption, the additional bit may indicate that the PPDU does not include the third signal field but include the STF and LTF for the second STA. That is, the first signal field may include signaling information notifying whether or not the third signal field and the STF and LTF for the second STA are included in the PPDU. That is, the third signal field and the STF and LTF for the second STA may be determined to be included or not included in the PPDU by signaling information being included in the first signal field.

The information on RU layout and the information on the number of STAs using the first RU may correspond to an RU allocation subfield being included in a common field of the second signal field. As an 8-bit field, the RU allocation subfield may be assumed to be '01000000'. According to the 8-bit RU allocation subfield shown in Table 9, the '01000000' includes RU layout information on that 106 RU/26 RU/26 RU/26 RU are being used in the whole frequency band (herein, the frequency band is assumed to be 20 MHz). That is, if the RU layout information is 01000000, the whole frequency band may be positioned with one 106 RU and four 26 RUs.

A user field of the second signal field may include a first user field for a first STA and a second user field for a second STA. That is, each of the first user field and the second user field may include the information on S-TDMA.

S-TDMA indication information being included in the first user field may indicate that the first STA is capable of performing S-TDMA. First symbol offset information, which is included in the first user field, may indicate from which point a first data field is being transmitted. That is, the first STA may decode the common field of the second signal field and the first user field so as to know that the first data field is being received in the first RU during the first symbol.

S-TDMA indication information being included in the second user field may indicate that the second STA is capable of performing S-TDMA. Second symbol offset information, which is included in the second user field, may indicate from which point a second data field is being transmitted. That is, the second STA may decode the common field of the second signal field and the second user field so as to know that the second data field is being received in the first RU during the second symbol.

In case of a third STA where the S-TDMA is not applied and only the OFDMA is being applied, the third STA is described as follows. A user field of the second signal field may include a third user field for the third STA. S-TDMA indication information being included in the third user field may indicate that the third STA cannot perform S-TDMA. That is, the third STA may decode the common field of the second signal field and the third user field so as to know that the third data field is received only in the second RU by using a simple OFDMA scheme.

According to the above-described method, by time-dividing one RU and allocating the time-divided RU to multiple STAs, waste of resource may be reduced.

Effects of the Disclosure

This specification proposes a scheme for transmitting/receiving a PPDU based on S-TDMA in a wireless LAN system.

According to the embodiments proposed in this specification, by generating a PPDU configured of fields being newly defined based on S-TDMA, and by performing time-division on one RU and allocating the time-divided RU to multiple STAs, waste of resources may be reduced.

BRIEF DESCRIPTION OF THE DRAWINGS

FIG. 1 is a conceptual view illustrating the structure of a wireless local area network (WLAN).

FIG. 15 illustrates an exemplary S-TDMA MU PPDU structure according to an embodiment of the present disclosure.

FIG. 16 illustrates an exemplary S-TDMA MU PPDU structure reusing a HE MU PPDU according to an embodiment of the present disclosure.

DESCRIPTION OF EXEMPLARY EMBODIMENTS

Figure 2:
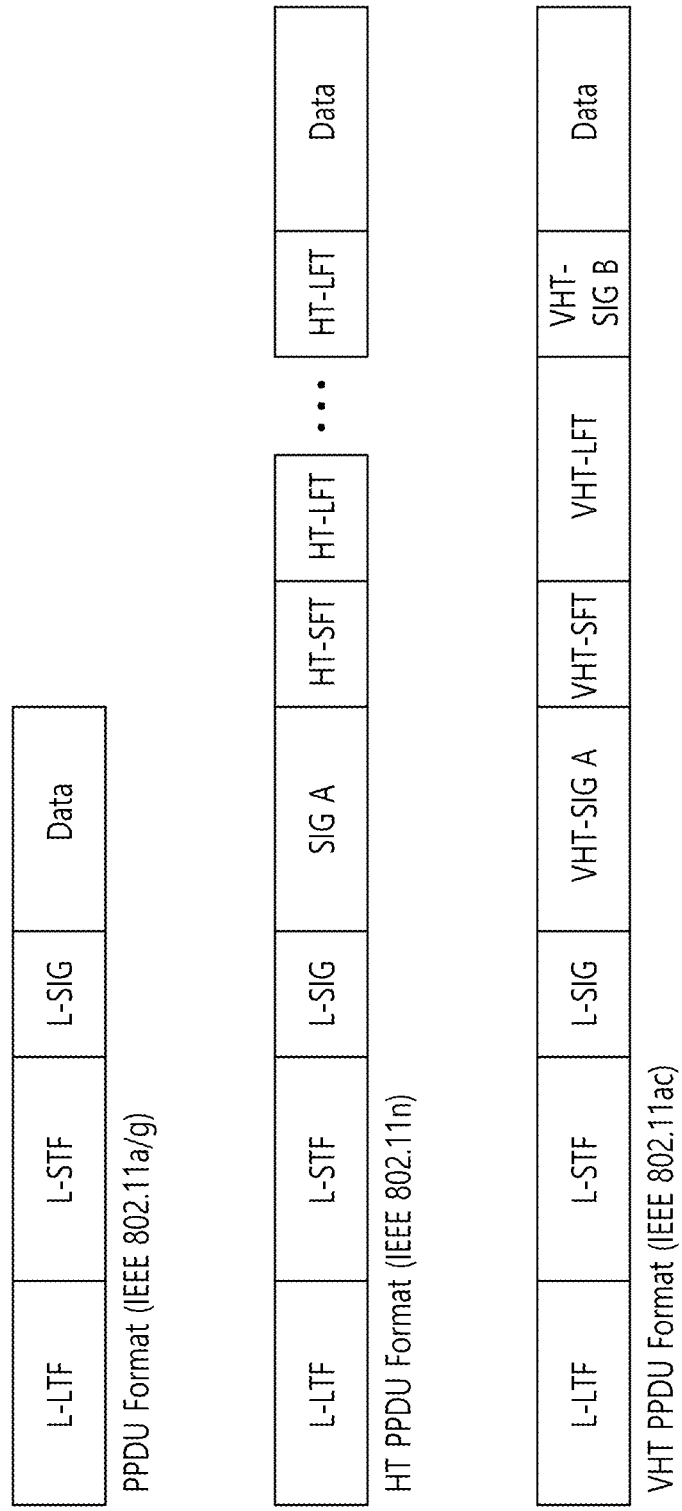
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBS S, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
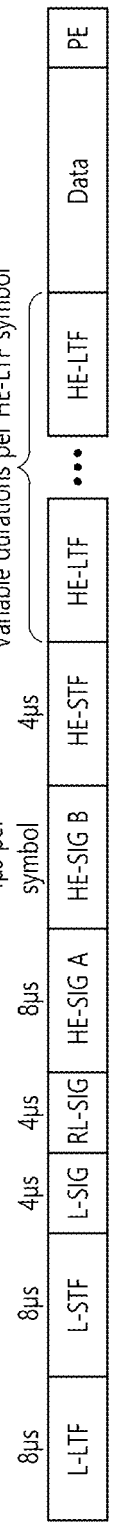
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
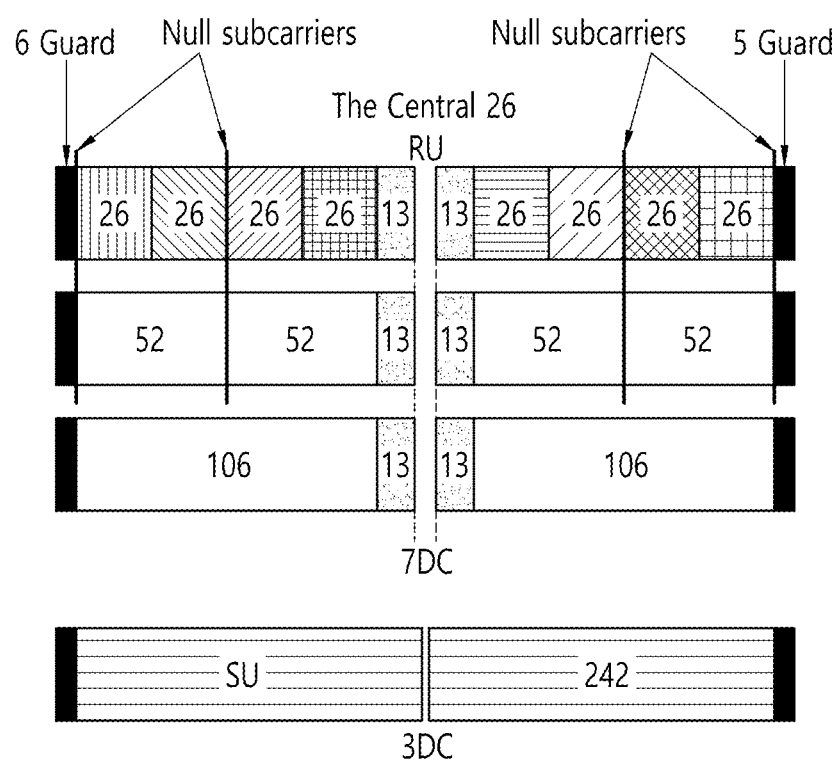
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
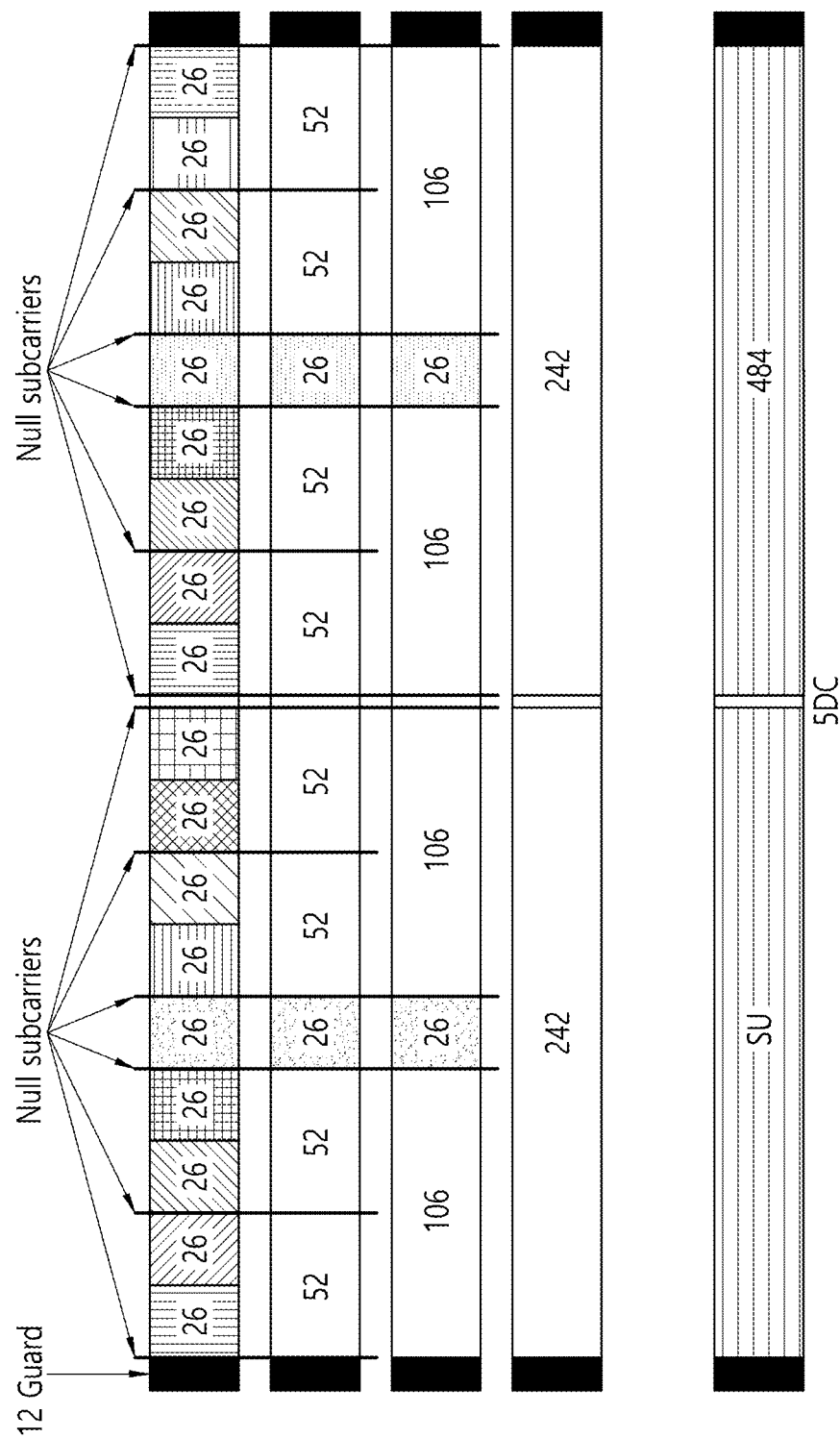
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
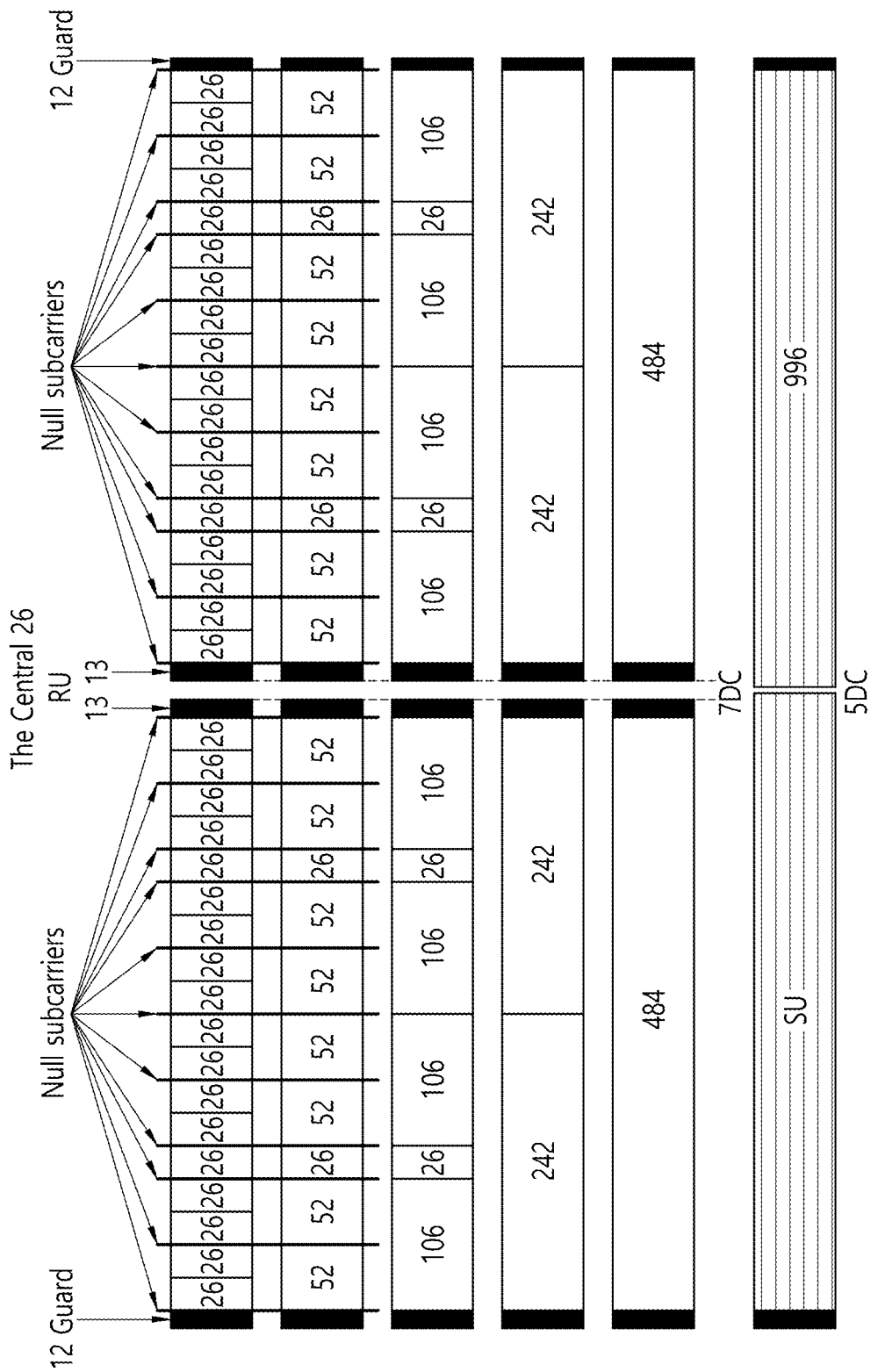
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
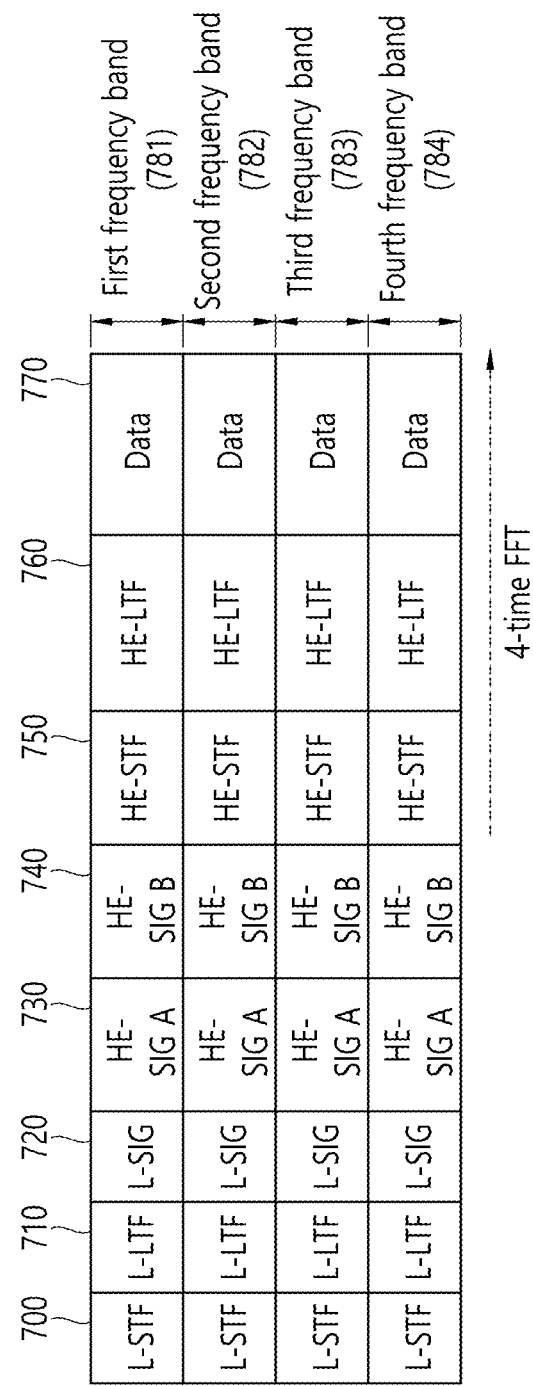
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-toneRU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), sec 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 1-continued

| Two Parts of HE-SIG-A | Bit | Field | Number of bits | Description |
|---|---|---|---|---|
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate:<br>a 4x HE-LTF and 0.8 µs GI if both the DCM and STBC fields are 1. Neither DCM nor STBC shall be applied if(#Ed) both the DCM and STBC fields are set to 1.<br>a 4x HE-LTF and 3.2 µs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor((TXOP_DURATION − 512)/128)(#16277).<br>where(#16061)<br>B0 indicates the TXOP length granularity. Set to 0 for 8 µs; otherwise set to 1 for 128 µs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |

TABLE 1-continued

| Two Parts of HE-SIG-A | Bit | Field | Number of bits | Description |
|---|---|---|---|---|
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise |
| | B16-B19 | CRC | 4 | CRC for bits 0-41 of the HE-STG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. (#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured. |

TABLE 2-continued

| Two Parts of HE-SIG-A | Bit | Field | Number of bits | Description |
|---|---|---|---|---|
| | | | | Set to 5 for preamble puncturing in 80 MHz, where in the preamble only one of the two 20 MHz sub-channels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(# 15495). |
| | B22 | STGB Compression | 1 | Set to 0 if the Common field in HE-SIG-B is present. Set to 1 if the Common field in HE-SIG-B is not present. (#16139) |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION − 512)/128)(#16277). where(#16061) B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF SymbolsAnd Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols |

TABLE 2-continued

| Two Parts of HE-SIG-A | Bit | Field | Number of bits | Description |
|---|---|---|---|---|
| | | | | Set to 3 for 6 HE-LTF symbols<br>Set to 4 for 8 HE-LTF symbols<br>Other values are reserved.<br>If the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. (#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based |

TABLE 3-continued

| Two Parts of HE-SIG-A | Bit | Field | Number of bits | Description |
|---|---|---|---|---|
| | | | | spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then this field is set to the same value as Spatial |

TABLE 3-continued

| Two Parts of HE-SIG-A | Bit | Field | Number of bits | Description |
|---|---|---|---|---|
| | | | | Reuse 2 field.<br>If the Bandwidth field indicates 160/80 + 80 MHz:<br>This Spatial Reuse field applies to the fourth<br>40 MHz subband of the 160 MHz operating band.<br>If(#Ed) the STA operating channel width is<br>80 + 80 MHz, then this field is set to same value as<br>Spatial Reuse 2 field.<br>Set to the value of the SPATIAL_REUSE(4) parameter<br>of the TXVECTOR, which contains a value from<br>Table 28-22 (Spatial Reuse field encoding for an HE<br>TB PPDU) for an HE TB PPDU (see 27.11.6<br>(SPATIAL_REUSE)).<br>Set to SRP_DISALLOW to prohibit SRP-based spatial<br>reuse during this PPDU. Set to<br>SRP_AND_NON_SRG_OBSS_PD_PROHIBITED to prohibit<br>both SRP-based spatial reuse and non-SRG OBSS PD-based<br>spatial reuse during this PPDU. For the interpretation<br>of other values see 27.11.6 (SPATIAL_REUSE) and 27.9<br>(Spatial reuse operation). |
| | B23 | Reserved | 1 | Reserved and set to 1.<br>NOTE-Unlike other Reserved fields in HE-SIG-A of<br>the HE TB PPDU, B23 does not have a corresponding<br>bit in the Trigger frame. |
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information<br>if(#15499) TXVECTOR parameter TXOP_DURATION<br>is set to UNSPECIFIED.<br>Set to a value less than 127 to indicate duration<br>information for NAV setting and protection of the<br>TXOP as follows:<br>If TXVECTOR parameter TXOP_DURATION is<br>less than 512, then B0 is set to 0 and B1-B6 is set to<br>floor(TXOP_DURATION/8)(#16277).<br>Otherwise, B0 is set to 1 and B1-B6 is set to floor<br>((TXOP_DURATTON − 512)/128)(#16277).<br>where(#16061)<br>B0 indicates the TXOP length granularity. Set to 0<br>for 8 µs; otherwise set to 1 for 128 µs.<br>B1-B6 indicates the scaled value of the<br>TXOP_DURATION |
| | B7-B15 | Reserved | 9 | Reserved and set to value indicated in the UL<br>HE-SIG-A2 Reserved sublield in the Trigger frame. |
| | B16-B19 | CRC | 4 | CRC of bits 0-41 of the HE-SIG-A field. See<br>28.3.10.7.3 (CRC computation). Bits 0-41 of the<br>HE-SIG-A field correspond to bits 0-25 of HE-SIG-A1<br>followed by bits 0-15 of HE-SIG-A2). |
| | B20-B25 | Tail | 6 | Used to terminate the trellis of the convolutional<br>decoder.<br>Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
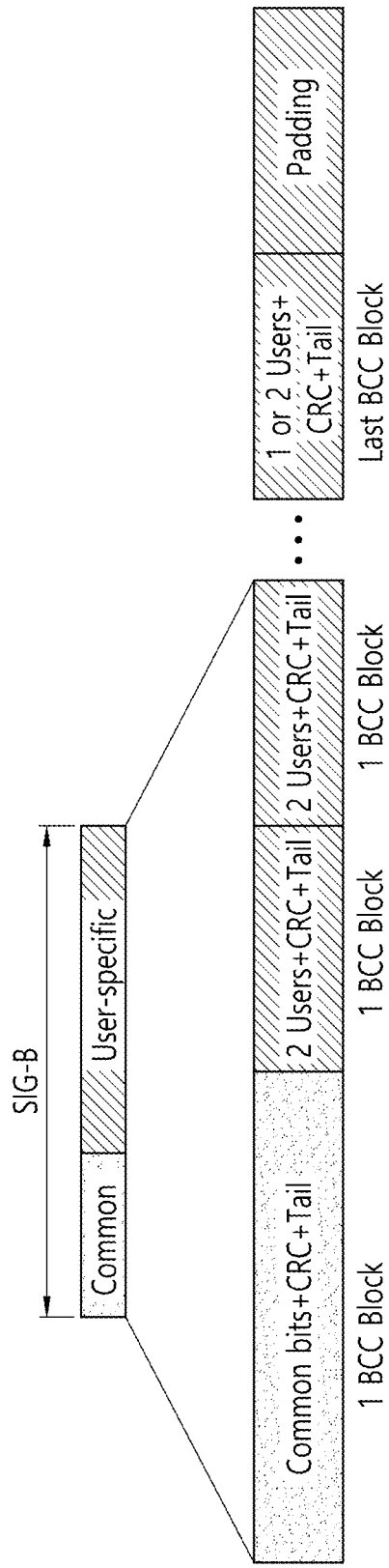
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
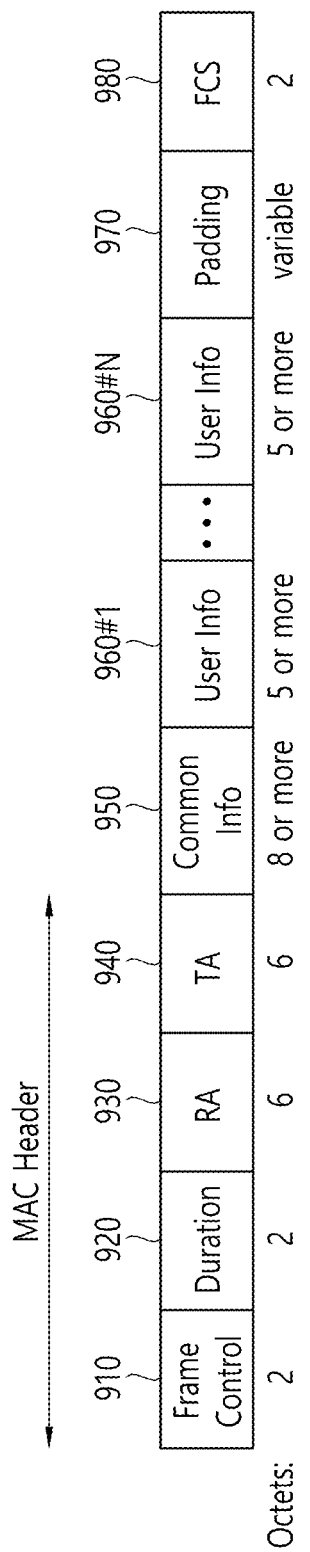
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960#1 to 960#N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960#1 to 960#N) shown in FIG. 9 includes a plurality of subfields.

Figure 10:
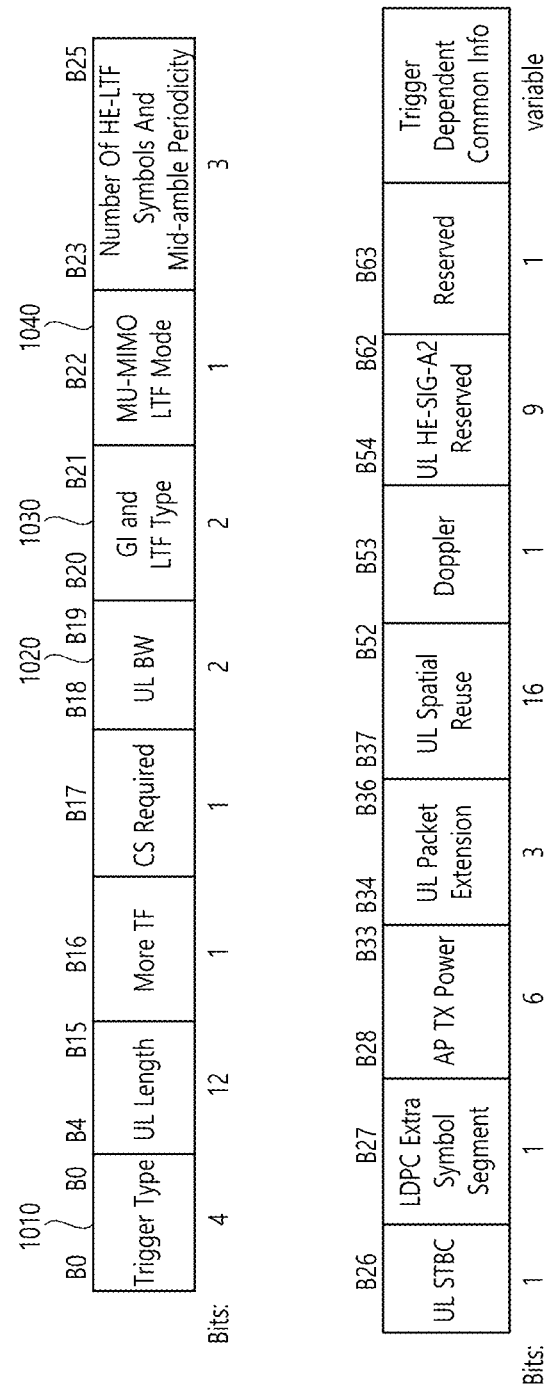
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1x HE-LTF + 1.6 µs GI |
| 1 | 2x HE-LTF + 1.6 µs GI |
| 2 | 4x HE- LTF + 3.2 µs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
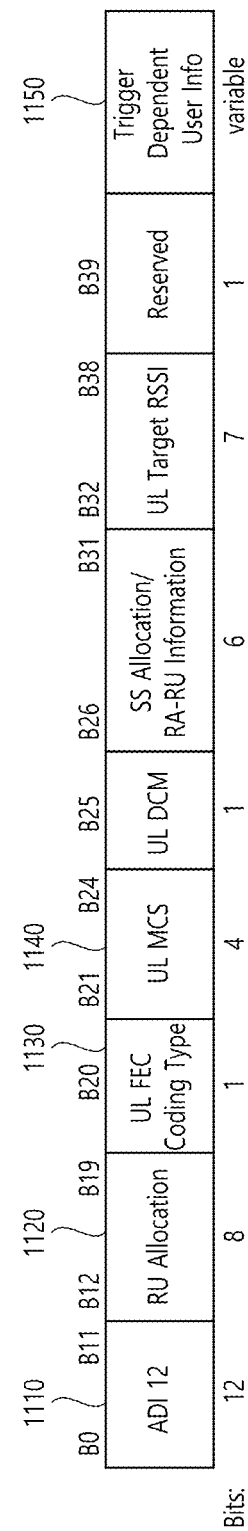
FIG. 11 illustrates an example of a subfield being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to termmate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |
| 00001011 | 52 | 26 | 26 | 26 | 52 | 52 | | | | 1 |
| 00001100 | 52 | 52 | 26 | 26 | 26 | 26 | 26 | | | 1 |
| 00001101 | 52 | 52 | 26 | 26 | 26 | 52 | | | | 1 |
| 00001110 | 52 | 52 | 26 | 52 | 26 | 26 | | | | 1 |
| 00001111 | 52 | 52 | 26 | 52 | 52 | | | | | 1 |
| 00010$y_2y_1y_0$ | 52 | | 52 | — | | 106 | | | | 8 |
| 00011$y_2y_1y_0$ | | 106 | | — | 52 | | 52 | | | 8 |
| 00100$y_2y_1y_0$ | 26 | 26 | 26 | 26 | 26 | | 106 | | | 8 |
| 00101$y_2y_1y_0$ | 26 | 26 | 52 | 26 | | 106 | | | | 8 |
| 00110$y_2y_1y_0$ | 52 | | 26 | 26 | 26 | | 106 | | | 8 |
| 00111$y_2y_1y_0$ | 52 | | 52 | 26 | | 106 | | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | 26 | 26 | | 8 |
| 01011$y_2y_1y_0$ | | 106 | | | 26 | 52 | 52 | | | 8 |
| 0110$y_1y_0z_1z_0$ | | 106 | | — | | 106 | | | | 16 |
| 01110000 | 52 | | 52 | — | 52 | | 52 | | | 1 |
| 01110001 | | | | 242-tone RU empty | | | | | | 1 |
| 01110010 | | | 484-tone RU with zero User fields indicated in this RU Allocation subfield of the HE-SIG-B content channel | | | | | | | 1 |
| 01110011 | | | 996-tone RU with zero User fields indicated in this RU Allocation subfield of the HE-SIG-B content channel | | | | | | | 1 |
| 011101$x_1x_0$ | | | | | Reserved | | | | | 4 |
| 01111$y_2y_1y_0$ | | | | | Reserved | | | | | 8 |
| 10$y_2y_1y_0z_2z_1z_0$ | | 106 | | | 26 | | 106 | | | 64 |
| 11000$y_2y_1y_0$ | | | | | 242 | | | | | 8 |
| 11001$y_2y_1y_0$ | | | | | 484 | | | | | 8 |
| 11010$y_2y_1y_0$ | | | | | 996 | | | | | 8 |
| 11011$y_2y_1y_0$ | | | | | Reserved | | | | | 8 |
| 111$x_4x_3x_2x_1x_0$ | | | | | Reserved | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |

TABLE 10-continued

| Subfield | Number of bits | Description |
|---|---|---|
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 2

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed(#16038) | 1 | Use of transmit beamforming. Set to 1 if a beamforming steering matrix is applied to the waveform in an SU transmission. Set to 0 otherwise. |
| B15-B18 | MCS | 4 | Modulation and coding scheme Set to n for MCSn, where n = 0, 1, 2 . . . , 11 Values 12 to 15 are reserved |
| B19 | DCM | 1 | Indicates whether or not DCM is used. Set to 1 to indicate that the payload(#Ed) of the corresponding user of the HE MU PPDU is modulated with DCM for the MCS. Set to 0 to indicate that the payload of the corresponding user of the PPDU is not modulated with DCM for the MCS. NOTE-DCM is not applied in combination with STBC. (#15664) |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values. (#15946)

User fields for MU-MIMO allocation are as described below.

TABLE 13

| Bit | Subfield | Number of bits | Description |
|---|---|---|---|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set to n for MCSn, where n = 0, 1, 2, . . . , 11 Values 12 to 15 are reserved |

TABLE 13-continued

| Bit | Subfield | Number of bits | Description |
|---|---|---|---|
| B19 | Reserved | 1 | Reserved and set to 0 |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values. (#15946)

Figure 12:
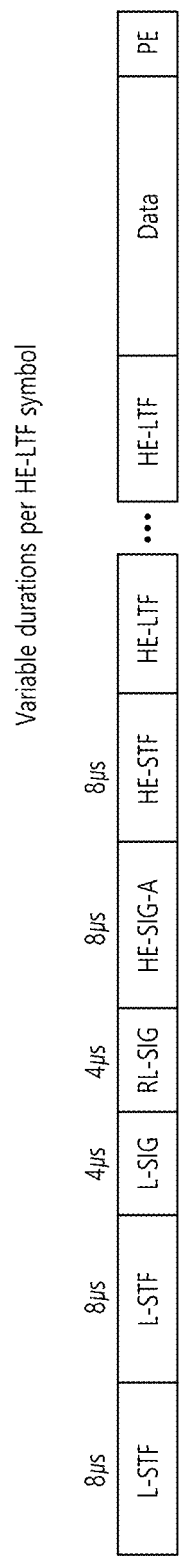
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

Although a PHY transmit/receive procedure in Wi-Fi may have different detailed packet configuration methods, the PHY transmit/receive procedure will be described as follows. For simplicity, although examples will only be presented for 11n and flax, 11g/ac also follows a similar procedure.

That is, in a PHY transmit procedure, when a MAC protocol data unit (MPDU) or Aggregate MPDU (A-MPDU) arrives at a MAC end, the MPDU or A-MPDU are converted to a Single PHY service data unit (PSDU), at a PHY end, and then transmitted after inserting a Preamble, Tail bits, and padding bits (if needed). This is referred to as a PPDU.

Generally, a PHY receive procedure is as described below. When energy detection and preamble detection (L/HT/VHT/HE-preamble detection per Wi-Fi version) are performed, information on a PSDU configuration is obtained (or acquired) from a PHY header (L/HT/VHT/HE-SIG), and, then, a MAC header is read, and data is read.

1. Embodiments Applicable to the Present Disclosure

Figure 13:
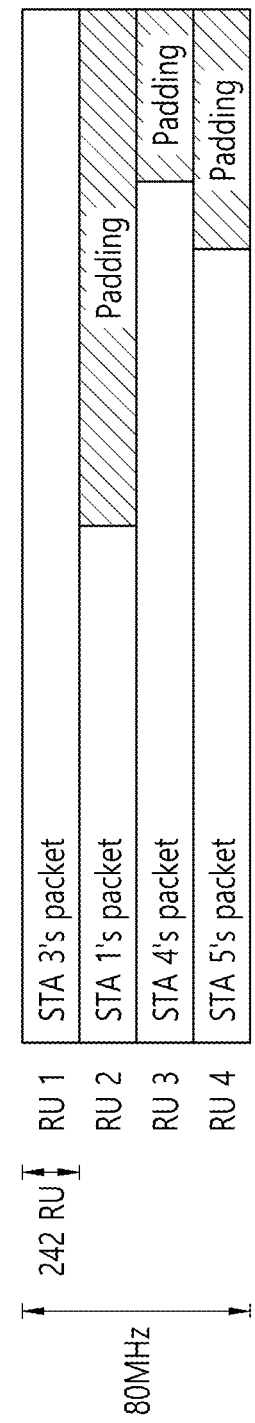
FIG. 13 illustrates an example of a DL MU packet being allocated to a RU, wherein the DL MU packet is transmitted by multiple STAs using 802.11 OFDMA.

FIG. 13 illustrates an example of a DL MU packet being allocated to a RU, wherein the DL MU packet is transmitted by multiple STAs using 802.11 OFDMA.

When performing OFDMA DL transmission, in case a data size, MCS, and so on, of each STA is/are different, a MU packet matches its length to a packet length of STA 3, which has the longest length. And, accordingly, after filling each packet of the RU being allocated to STAs 1, 4, and 5, the remaining resource parts are filled with padding bits. Therefore, the present disclosure proposes a Scheduled-Time Division Multiple Access (S-TDMA) technique enabling DL transmission to be performed by additionally allocating data of one or more STAs to empty parts, i.e., padding parts of the RU, when performing DL MU packet transmission using 802.11 OFDMA. S-TDMA is a technique for allocating data to the RU via scheduling while additionally considering a time domain, in addition to the frequency domain, which is considered in the conventional OFDMA. That is, by time-dividing one RU and allocating the time-divided RU to multiple STAs, waste of resources may be reduced.

Figure 14:
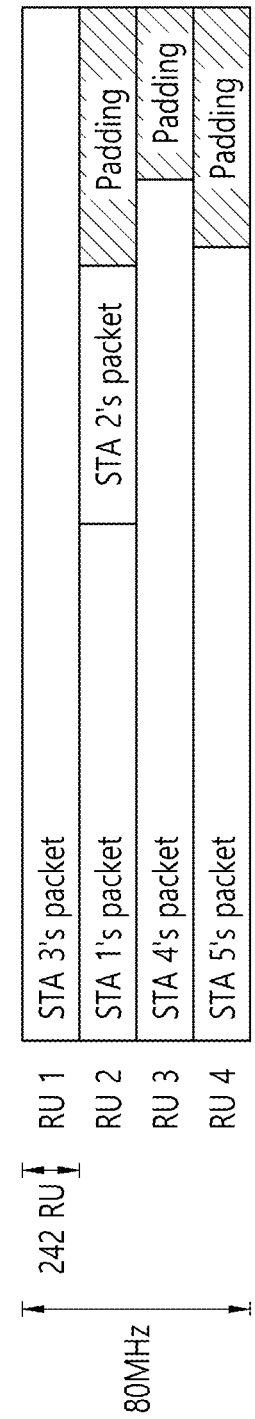
FIG. 14 illustrates an example of a DL MU packet being allocated to a RU by using an OFDMA-based S-TDMA technique.

FIG. 14 illustrates an example of a DL MU packet being allocated to a RU by using an OFDMA-based S-TDMA technique.

As shown in FIG. 14, when remaining resource, i.e., padding, occurs in a RU having a packet of STA 1 allocated thereto, a packet of STA 2 may be additionally allocated to the corresponding RU. Apart from the packet of STA 2, if there exists a packet of another STA that may be allocated to the padding, the packet may be additionally allocated to the corresponding RU. This specification proposes, in detail, a PPDU structure for supporting DL transmission by using the S-TDMA technique.

2. Proposed Embodiments 2.1. S-TDMA MU PPDU Structure

The PPDU structure that is proposed in this specification is referred to as an S-TDMA MU PPDU. The S-TDMA PPDU structure, which will hereinafter be described, assumes a situation where data of STA 1 and data of STA 2 are consecutively allocated in RU 2 of FIG. 14. As S-TDMA is applied, information that may be additionally included as compared to the conventional 802.11ax OFDMA is/are as follows.

S-TDMA PPDU format: This indicates whether or not a specific field (e.g., SIG-C) is included.
Data allocation information using S-TDMA
  S-TDMA indication: This indicates whether or not each STA uses the same RU via S-TDMA.
  Starting (or Ending) symbol offset: This is a packet start (or end) point of each STA (in Symbol units).
  End of S-TDMA: This indicates last data of S-TDMA in one RU.

2.1.1. New S-TDMA MU PPDU Structure

FIG. 15 illustrates an exemplary S-TDMA MU PPDU structure according to an embodiment of the present disclosure.

As shown in FIG. 15, for backward compatibility, the S-TDMA MU PPDU structure first starts with a Legacy PHY header, which includes L-STF, L-LTF, L-SIG, RL-SIG, and so on, and is then followed by S-TDMA SIG, STF, and LTF fields for receiving transmitted data and decoding the received data. Most particularly, the S-TDMA SIG-C field and an additional STF (A-STF) or additional LTF (A-LTF) field, which has been additionally included previously (or earlier) in additionally allocated data, which is STA 2 data, may exist or may not exist. Additionally, depending upon the number of additionally allocated STAs, a plurality of the A-STF or A-LTF may exist. Additionally, a Guard time (e.g., SIFS) may also be applied between the data and its next S-TDMA A-STF (or A-LTF or data).

Information that may be included in each field of FIG. 15 is/are as follows.

<S-TDMA SIG-A>
Common information (information related to bandwidth, BSS color, LTF, and so on) being included in HE-SIG-A of 802.11ax and an S-TDMA PPDU format (indicating whether or not SIG-C, A-STF, A-LTF, and so on, is/are included), and so on, are included herein.

<S-TDMA SIG-B & SIG-C>

In case SIG-C does not exist, S-TDMA SIG-B includes information (RU allocation, MCS, coding, and so on) included HE-SIG-B of 802.11ax, which is information related to data transmission using OFDMA, and additional information (S-TDMA indication, Starting/Ending symbol offset, End of S-TDMA, and so on) caused by the application of S-TDMA.

In case SIG-C exists, SIG-B includes only the information related to data transmission using OFDMA (RU allocation, MCS, coding, and so on), such as the HE-SIG-B of 802.11ax, and the additional information caused by the application of S-TDMA may be included the SIG-C information.

In the S-TDMA MU PPDU structure, in case A-STF and A-LTF are included, in a situation where the channel status changes abruptly, the decoding likelihood of the STA 2 data may be increased. However, an overhead equivalent to the added STF and LTF exists, and, in case a larger number of STAs exists, the overhead increases accordingly.

In the S-TDMA MU PPDU structure, in case SIG-C is included, the HE-SIG-A and HE-SIG-B of the conventional 802.11ax may be reused, and only the additional information caused by the application of S-TDMA may be included in the SIG-C. However, an overhead equivalent to the added SIG-C exists.

2.1.2. S-TDMA MU PPDU Structure Considering an HE MU PPDU Structure

FIG. 16 illustrates an exemplary S-TDMA MU PPDU structure reusing a HE MU PPDU according to an embodiment of the present disclosure.

As shown in FIG. 16, the S-TDMA PPDU structure may reuse the HE MU PPDU structure of the conventional 802.11ax, and modification is needed in order to support S-TDMA.

Firstly, in HE-SIG-A, a method for indicating the S-TDMA PPDU format (indicating whether or not SIG-C, A-STF, and A-LTF is/are included, and so on) is needed. And, the indication method is as follows.

1) Use B7 Bit, Which is a Reserved Bit of HE-SIG-A2

By using the existing bits, the whole format of SIG-A does not change. However, in case additional information is needed in the SIG-A due to the usage of remaining reserved bits, bits shall be added.

2) Add Bits to Format field in HE-SIG-A o By adding bit to a first field that differentiates formats in the conventional 11ax, although the application or non-application of S-TDMA may be immediately identified, due to the addition of bits, the length of the SIG-A may be extended (or increased).

3) Generate a New Field by Adding Bits

S-TDMA SIG-C may include additional information caused by the application of S-TDMA. Although the SIG-C may exist separately, the SIG-C may be integrated with SIG-B. That is, if the SIG-C is integrated with SIG-B, the HE-SIG-B shall notify S-TDMA related information. In this case, although the HE-SIG-B indicates a RU that is to be allocated to each STA through a RU allocation field of a common field, with the exception for the case of MU-MIMO, when applying S-TDMA, whether or not the same RU has been allocated and time points where each STA receives data cannot be differentiated. And, the indication method is as follows.

1) The indication method of the RU allocation field of the common field may be modified so that allocation considering S-TDMA can be included, and a starting symbol offset or ending symbol offset may be included by adding a bit to a user field, and the additional bit may include B19, which is a reserved bit of the User field.

2) By adding a bit to the User field, S-TDMA indication and a starting symbol offset are included. The additional bit may include B19, which is a reserved bit of the User field. That is, the RU is allocated as it is (i.e., without modification) by the RU allocation field of the Common field. And, the STA decodes the S-TDMA indication so as to verify whether or not it is capable of receiving data based on S-TDMA in the corresponding RU. Additionally, the STA may decode the starting symbol offset so as to verify from which start point the STA can receive data.

3) By adding a bit to the User field, S-TDMA indication, End of S-TDMA, and an ending symbol offset are included. The additional bit may include B19, which is a reserved bit of the User field. As described above in method 2), the RU is allocated as it is (i.e., without modification) by the RU allocation field of the Common field. And, the STA decodes the S-TDMA indication so as to verify whether or not it is capable of receiving data based on S-TDMA in the corresponding RU. Herein, the STA may decode the ending symbol offset so as to verify an end point of the data. Instead, by using an additional bit, the STA may indicate whether the data of the STA is the last data of the corresponding RU.

4) The part performing S-TDMA indication in each user field, in methods 2) and 3), are relocated to the common field, so as to be indicated in a bitmap format according to a user order.

Although an additional bit may be used in all of the four methods from method 1) to method 4) so as to support S-TDMA from the conventional 11ax format, an overhead equivalent to the added bit may be generated.

Figure 17:
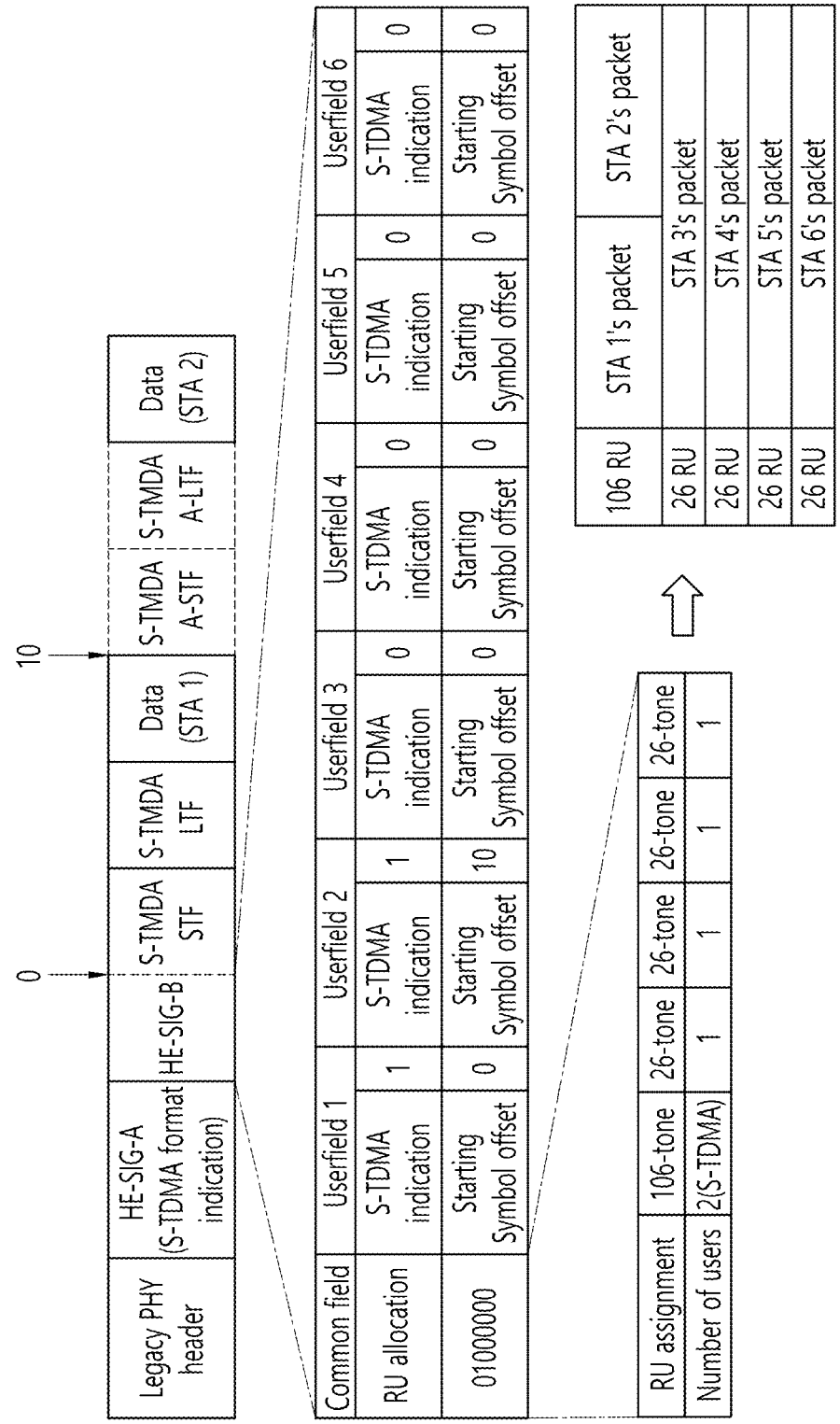
FIG. 17 illustrates an example of an DL MU packet being allocated to a RU by using an S-TDMA MU PPDU according to an embodiment of the present disclosure.

FIG. 17 illustrates an example of an DL MU packet being allocated to a RU by using an S-TDMA MU PPDU according to an embodiment of the present disclosure.

FIG. 17 is an example showing a relationship between a PPDU using S-TDMA indication and a starting symbol offset and RU allocation, which is the above-described method 2).

In case it is given that the S-TDMA MU PPDU of FIG. 17 reuses the HE MU PPDU and supports S-TDMA, this is a situation where format indication is performed in the HE-SIG-A and RU allocation is allocated as 106/26/26/26/26. When it is said that 106 RUs support 2 STAs by using S-TDMA, since STA 1 and STA 2 are allocated to the same RU, the S-TDMA indication value of the User field is set to 1. In case of STA 1, STA 1 identifies data corresponding to 10 symbols from the starting symbol offset of STA2 as its data. Additionally, a time (length) may also be calculated from the number of symbols. If a guard time exists between each STA data, a length equivalent to the guard time may be excluded. For STA 3, if the S-TDMA indication continues to maintain the value of 1 and indicates the Starting Symbol offset to 0, it may be known that S-TDMA is applied to the first 26 Rus. Herein, the Starting Symbol offset for the STA starting the beginning of the RU may be equal to 0 or may be equal to a value obtained by adding the length of a previous SIG.

Figure 18:
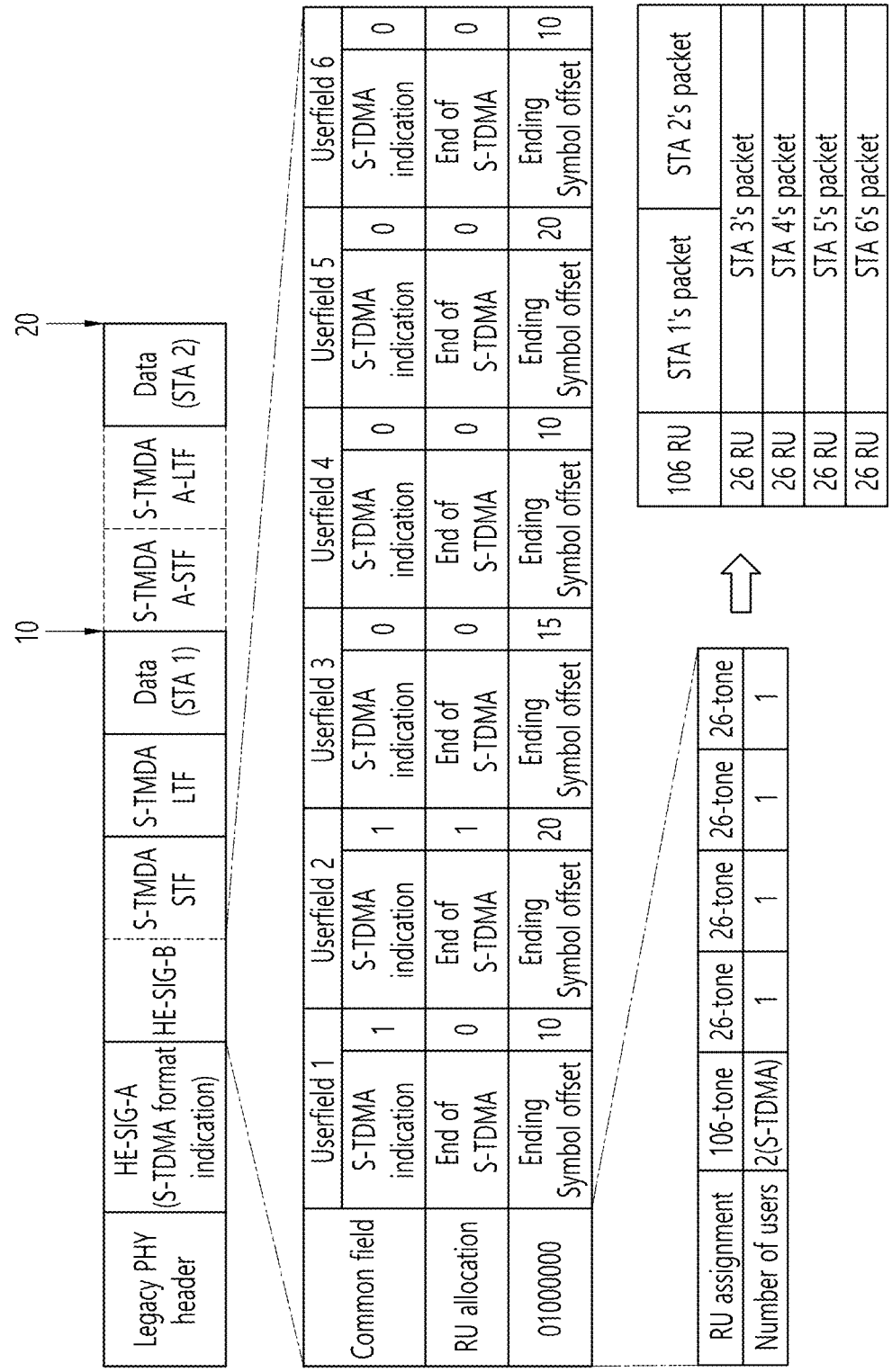
FIG. 18 illustrates another example of an DL MU packet being allocated to a RU by using an S-TDMA MU PPDU according to an embodiment of the present disclosure.

FIG. 18 illustrates another example of an DL MU packet being allocated to a RU by using an S-TDMA MU PPDU according to an embodiment of the present disclosure.

FIG. 17 is an example showing a relationship between a PPDU using S-TDMA indication, End of S-TDMA, and an ending symbol offset and RU allocation, which is the above-described method 3), among the methods described above in the situation of FIG. 17. In case of using an ending symbol offset, unlike the starting symbol offset, in case of continuously applying S-TDMA to the RU, there may occur a case where it is difficult to know to which RU the STA is allocated. Therefore, in case of using the ending symbol offset, an End of S-TDMA indication is additionally needed. Since STA 1 and STA 2 are allocated to the same RU, the S-TDMA indication value of the User field is set to 1, and since data no longer exists in the 106 RUs after STA 2, the End of S-TDMA value of User field 2 is set to 1. Most particularly, if the start point of the symbol offset is 0, the ending symbol offset may calculate the number of symbols of each STA.

Hereinafter, the above-described embodiment will be described according to a time flow with reference to FIG. 14 to FIG. 18.

Figure 19:
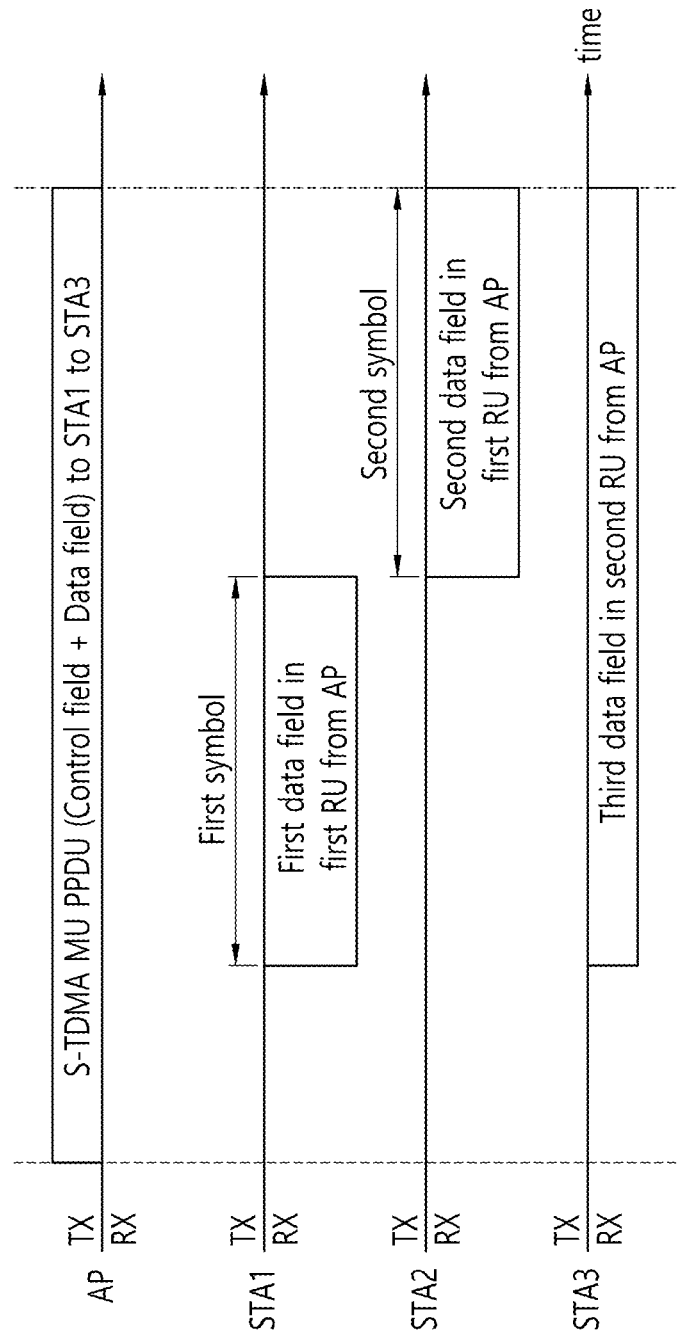
FIG. 19 is a diagram showing a procedure wherein a MU PPDU is transmitted based on S-TDMA according to an embodiment of the present disclosure.

FIG. 19 is a diagram showing a procedure wherein a MU PPDU is transmitted based on S-TDMA according to an embodiment of the present disclosure.

S-TDMA is a scheme allocating a data field to a RU via scheduling while considering OFDMA in a frequency domain and additionally considering TDMA in a time domain.

Referring to FIG. 19, an AP transmits an S-TDMA MU PPDU to STA1 to STA3. The S-TDMA MU PPDU includes a control field and a data field.

STA1 decodes a control field of the S-TDMA MU PPDU so as to verify that it is using a first RU and the S-TDMA is being applied. Thus, STA1 may receive a first data field, which is its own data, in the first RU during a first symbol.

STA2 decodes a control field of the S-TDMA MU PPDU so as to verify that it is using a first RU and the S-TDMA is being applied. Similarly, STA2 may receive a second data field, which is its own data, in the first RU during a second symbol. That is, from the same first RU, the first data field is transmitted during the first symbol, and the second data field is transmitted during the second symbol.

However, STA3 shows that only OFDMA is being applied. That is, STA3 decodes the control field of the S-TDMA MU PPDU so as to verify that S-TDMA is not applied even though it is using a second RU. That is, STA3 alone is allocated with the second RU. STA3 may receive a third data field, which is its own data, in the second RU. That is, the first data field and the second data field may be transmitted in the first RU, and the third data field may be transmitted in the second RU. According to FIG. 19, the third data may be transmitted at the same time as the first data field and the second data field from different frequency bands.

Detailed description of the S-TDMA MU PPDU will be described later on with reference to FIG. 20 and FIG. 21.

Figure 20:
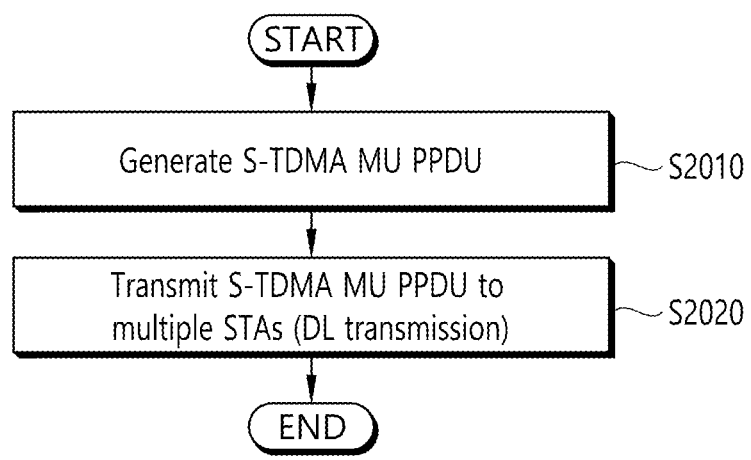
FIG. 20 is a flow chart showing a procedure of transmitting, by an AP, a MU PPDU based on S-TDMA according to an embodiment of the present disclosure.

FIG. 20 is a flow chart showing a procedure of transmitting, by an AP, a MU PPDU based on S-TDMA according to an embodiment of the present disclosure.

An example of FIG. 20 may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field, HE-SIG-B field, HE-STF field, and HE-LTF field may all be PPDU and fields that are defined in the 802.11ax system. S-TDMA MU PPDU, S-TDMA SIG-A field (first signal field), S-TDMA SIG-B field (second signal field), S-TDMA STF, and S-TDMA LTF may be PPDU and fields that are defined for performing S-TDMA in a next generation wireless LAN system. S-TDMA SIG-C field (third signal field) may be a signal field that is newly defined for performing S-TDMA in a next generation wireless LAN system. However, the PPDU and fields that are defined for performing S-TDMA may be generated by using each subfield of the HE PPDU without any modification in order to satisfy backward compatibility with the 802.11ax system.

An example of FIG. 20 is performed in a transmitting device, and the transmitting device may correspond to an AP. A receiving device of FIG. 20 may correspond to a (non-AP STA) STA having S-TDMA capability.

In step S2010, an access point (AP) generates the PPDU.

In step S2020, the AP transmits the PPDU to a first station (STA) and a second STA. The PPDU may be an S-TDMA MU PPDU, which may be newly defined in a next generation wireless LAN system. Additionally, the PPDU may be generated by using a High Efficiency Multi User PPDU (HE MU PPDU). That is, the PPDU may be an S-TDMA MU PPDU, which is generated by reusing the HE MU PPDU.

The PPDU includes a legacy header field, a first signal field, a second signal field, a first data field for the first STA, and a second data field for the second STA.

The legacy header field may be related to Legacy-Short Training Field (L-STF), Legacy-Long Training Field (L-LTF), Legacy-Signal (L-SIG) field, or Repeated Legacy-Signal (RL-SIG) field, which are included in the HE MU PPDU.

The first signal field may be related to the HE-SIG-A field, which is included in the HE MU PPDU. Since the first signal field is defined for performing S-TDMA operations, this field may be referred to as an S-TDMA SIG-A field.

The second signal field may be related to the HE-SIG-B field, which is included in the HE MU PPDU. Since the second signal field is defined for performing S-TDMA operations, this field may be referred to as an S-TDMA SIG-B field.

The first data field and the second data field may be related to downlink (DL) data, which applies S-TDMA being scheduled to the same RU while considering the time domain.

The second signal field includes information on Resource Unit (RU) layout and information on a number of STAs using the first RU. The information on RU layout and the information on the number of STAs using the first RU may be an 8-bit RU allocation subfield for RU allocation, as shown in Table 9. The information on RU layout and the information on the number of STAs using the first RU may be included in a common field of the second signal field.

That is, the first STA or second STA may decode the second signal field so as to know the RU layout within the whole frequency band and the number of STAs using each RU being included in RU layout. At this point, the number of STAs using the first RU may be equal to 2 or more. This is because S-TDMA is a scheme in which two or more STAs transmit/receive data fields from one RU.

In case a third signal field is further included in the PPDU, the third signal field includes information on the S-TDMA. The information on the S-TDMA includes S-TDMA indication information on that the S-TDMA may be performed, first symbol offset information for the first data field, and second symbol offset information for the second data field. According to the above-described embodiment, a third signal field is additionally inserted in the PPDU, thereby generating an S-TMDA MU PPDU. Since the third signal field is newly defined for performing S-TDMA operations, the third signal field may be referred to as an S-TDMA SIG-C field.

The S-TDMA indication information includes information on that the first and second data fields are being allocated to the first RU. That is, the first STA or the second STA decodes the S-TDMA indication information so as to verify that the first STA or the second STA is using the first RU and that the first STA or the second STA is being allocated with its data field in the first RU via S-TDMA.

The first data field is transmitted in the first RU during a first symbol, which is determined by the first symbol offset information. The second data field is transmitted in the first RU during a second symbol, which is determined by the second symbol offset information.

For example, the first symbol offset information may include information on a transmission start point of the first data field. The second symbol offset information may include information on a transmission start point of the second data field (in case the symbol offset information is a Starting Symbol offset). The first symbol and the second symbol may be positioned by TDMA in the first RU. The second symbol may be positioned immediately after the first symbol. Additionally, the first symbol may be positioned immediately after the second symbol.

As another example, the first symbol offset information may include information on a transmission end point of the first data field. The second symbol offset information may include information on a transmission end point of the second data field (in case the symbol offset information is an Ending Symbol offset). The first symbol and the second symbol may be positioned by TDMA in the first RU. The information on S-TDMA may further include End of S-TDMA information for a data field being last transmitted in the first RU. If the transmission end point of a data field is only known, since it is difficult to determine whether or not a data field is being last transmitted from the corresponding RU, information on that the corresponding data field is being last transmitted may be notified through the End of S-TDMA information by using an additional bit.

In case a third signal field is not included in the PPDU, the second signal field may further include the information on S-TDMA. At this point, the information on RU layout and the information on the number of STAs using the first RU may be included in a common field of the second signal field. The information on S-TDMA may be included in a user field of the second signal field.

The PPDU may further include a Short Training Field (STF) and Long Training Field (LTF) for the first STA and an STF (S-TDMA A-STF) and LTF (S-TDMA A-LTF) for the second STA. That is, not only the STF and LTF for the first STA being allocated in the first RU but also the STF and LTF for the second STA being allocated in the first RU may be added. The STF and LTF for the second STA may be transmitted after the first data field and before the second data field. A guard time may be included between the first data field and the STF and LTF for the second STA.

Additionally, the AP may transmit the PPDU to a third STA. The PPDU may further include a third data field for the third STA. The third data field may be transmitted in a second RU, which is determined based on the second signal field. The first RU and the second RU are different frequency bands. That is, the third data field indicates that it may be received based on OFDMA.

Hereinafter, in case a third signal field is not included in the PPDU, the embodiment in which the second signal field includes the information on S-TDMA will be described in detail. Additionally, the embodiment in which the PPDU reuses a HE MU PPDU will be described in detail.

For example, the first signal field may include an additional bit indicating whether or not an S-TDMA MU PPDU includes a third signal field, and STF and LTF for a second STA (additional STF and LTF). According to the above-described assumption, the additional bit may indicate that the PPDU does not include the third signal field but include the STF and LTF for the second STA. That is, the first signal field may include signaling information notifying whether or not the third signal field and the STF and LTF for the second STA are included in the PPDU. That is, the third signal field and the STF and LTF for the second STA may be determined to be included or not included in the PPDU by signaling information being included in the first signal field.

The information on RU layout and the information on the number of STAs using the first RU may correspond to an RU allocation subfield being included in a common field of the second signal field. As an 8-bit field, the RU allocation subfield may be assumed to be '01000000'. According to the 8-bit RU allocation subfield shown in Table 9, the '01000000' includes RU layout information on that 106 RU/26 RU/26 RU/26 RU/26 RU are being used in the whole frequency band (herein, the frequency band is assumed to be 20 MHz). That is, if the RU layout information is 01000000, the whole frequency band may be positioned with one 106 RU and four 26 RUs.

A user field of the second signal field may include a first user field for a first STA and a second user field for a second STA. That is, each of the first user field and the second user field may include the information on S-TDMA.

S-TDMA indication information being included in the first user field may indicate that the first STA is capable of performing S-TDMA. First symbol offset information, which is included in the first user field, may indicate from which point a first data field is being transmitted. That is, the first STA may decode the common field of the second signal field and the first user field so as to know that the first data field is being received in the first RU during the first symbol.

S-TDMA indication information being included in the second user field may indicate that the second STA is capable of performing S-TDMA. Second symbol offset information, which is included in the second user field, may indicate from which point a second data field is being transmitted. That is, the second STA may decode the common field of the second signal field and the second user field so as to know that the second data field is being received in the first RU during the second symbol.

In case of a third STA where the S-TDMA is not applied and only the OFDMA is being applied, the third STA is described as follows. A user field of the second signal field may include a third user field for the third STA. S-TDMA indication information being included in the third user field may indicate that the third STA cannot perform S-TDMA. That is, the third STA may decode the common field of the second signal field and the third user field so as to know that the third data field is received only in the second RU by using a simple OFDMA scheme.

According to the above-described method, by time-dividing one RU and allocating the time-divided RU to multiple STAs, waste of resource may be reduced.

Figure 21:
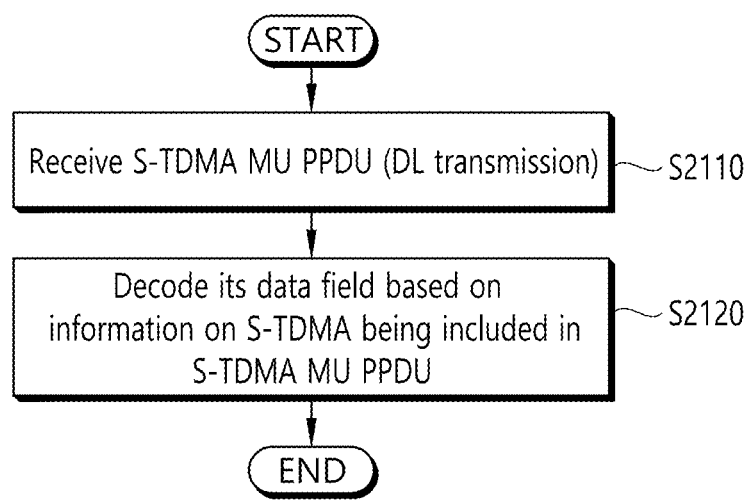
FIG. 21 is a flow chart showing a procedure of receiving, by an STA, a MU PPDU based on S-TDMA according to an embodiment of the present disclosure.

FIG. 21 is a flow chart showing a procedure of receiving, by an STA, a MU PPDU based on S-TDMA according to an embodiment of the present disclosure.

An example of FIG. 21 may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field, HE-SIG-B field, HE-STF field, and HE-LTF field may all be PPDU and fields that are defined in the 802.11ax system. S-TDMA MU PPDU, S-TDMA SIG-A field (first signal field), S-TDMA SIG-B field (second signal field), S-TDMA STF, and S-TDMA LTF may be PPDU and fields that are defined for performing S-TDMA in a next generation wireless LAN system. S-TDMA SIG-C field (third signal field) may be a signal field that is newly defined for performing S-TDMA in a next generation wireless LAN system. However, the PPDU and fields that are defined for performing S-TDMA may be generated by using each subfield of the HE PPDU without any modification in order to satisfy backward compatibility with the 802.11ax system.

An example of FIG. 21 may be performed in a receiving device, and the receiving device may correspond to a (non-AP STA) STA having S-TDMA capability. A transmitting device of FIG. 21 may correspond to an AP.

In step S2110, a first station (STA) receives the PPDU from an access point (AP). The PPDU includes a first data field for the first STA and a second data field for the second STA. The PPDU may be an S-TDMA MU PPDU, which may be newly defined in a next generation wireless LAN system. Additionally, the PPDU may be generated by using a High Efficiency Multi User PPDU (HE MU PPDU). That is, the PPDU may be an S-TDMA MU PPDU, which is generated by reusing the HE MU PPDU.

In step S2120, the first STA decodes the first data field.

The PPDU further includes a legacy header field, a first signal field, and a second signal field.

The legacy header field may be related to Legacy-Short Training Field (L-STF), Legacy-Long Training Field (L-LTF), Legacy-Signal (L-SIG) field, or Repeated Legacy-Signal (RL-SIG) field, which are included in the HE MU PPDU.

The first signal field may be related to the HE-SIG-A field, which is included in the HE MU PPDU. Since the first signal field is defined for performing S-TDMA operations, this field may be referred to as an S-TDMA SIG-A field.

The second signal field may be related to the HE-SIG-B field, which is included in the HE MU PPDU. Since the second signal field is defined for performing S-TDMA operations, this field may be referred to as an S-TDMA SIG-B field.

The first data field and the second data field may be related to downlink (DL) data, which applies S-TDMA being scheduled to the same RU while considering the time domain.

The second signal field includes information on Resource Unit (RU) layout and information on a number of STAs using the first RU. The information on RU layout and the information on the number of STAs using the first RU may be an 8-bit RU allocation subfield for RU allocation, as shown in Table 9. The information on RU layout and the information on the number of STAs using the first RU may be included in a common field of the second signal field.

That is, the first STA or second STA may decode the second signal field so as to know the RU layout within the whole frequency band and the number of STAs using each RU being included in RU layout. At this point, the number of STAs using the first RU may be equal to 2 or more. This is because S-TDMA is a scheme in which two or more STAs transmit/receive data fields from one RU.

In case a third signal field is further included in the PPDU, the third signal field includes information on the S-TDMA. The information on the S-TDMA includes S-TDMA indication information on that the S-TDMA may be performed, first symbol offset information for the first data field, and second symbol offset information for the second data field. According to the above-described embodiment, a third signal field is additionally inserted in the PPDU, thereby generating an S-TMDA MU PPDU. Since the third signal field is newly defined for performing S-TDMA operations, the third signal field may be referred to as an S-TDMA SIG-C field.

The S-TDMA indication information includes information on that the first and second data fields are being allocated to the first RU. That is, the first STA or the second STA decodes the S-TDMA indication information so as to verify that the first STA or the second STA is using the first RU and that the first STA or the second STA is being allocated with its data field in the first RU via S-TDMA.

The first data field is transmitted in the first RU during a first symbol, which is determined by the first symbol offset information. The second data field is transmitted in the first RU during a second symbol, which is determined by the second symbol offset information.

For example, the first symbol offset information may include information on a transmission start point of the first data field. The second symbol offset information may include information on a transmission start point of the second data field (in case the symbol offset information is a Starting Symbol offset). The first symbol and the second symbol may be positioned by TDMA in the first RU. The second symbol may be positioned immediately after the first symbol. Additionally, the first symbol may be positioned immediately after the second symbol.

As another example, the first symbol offset information may include information on a transmission end point of the first data field. The second symbol offset information may include information on a transmission end point of the second data field (in case the symbol offset information is an Ending Symbol offset). The first symbol and the second symbol may be positioned by TDMA in the first RU. The information on S-TDMA may further include End of S-TDMA information for a data field being last transmitted in the first RU. If the transmission end point of a data field is only known, since it is difficult to determine whether or not a data field is being last transmitted from the corresponding RU, information on that the corresponding data field is being last transmitted may be notified through the End of S-TDMA information by using an additional bit.

In case a third signal field is not included in the PPDU, the second signal field may further include the information on S-TDMA. At this point, the information on RU layout and the information on the number of STAs using the first RU may be included in a common field of the second signal field. The information on S-TDMA may be included in a user field of the second signal field.

The PPDU may further include a Short Training Field (STF) and Long Training Field (LTF) for the first STA and an STF (S-TDMA A-STF) and LTF (S-TDMA A-LTF) for the second STA. That is, not only the STF and LTF for the first STA being allocated in the first RU but also the STF and LTF for the second STA being allocated in the first RU may be added. The STF and LTF for the second STA may be transmitted after the first data field and before the second data field. A guard time may be included between the first data field and the STF and LTF for the second STA. That is, the first signal field may include signaling information notifying whether or not the third signal field and the STF and LTF for the second STA are included in the PPDU. That is, the third signal field and the STF and LTF for the second STA may be determined to be included or not included in the PPDU by signaling information being included in the first signal field.

Additionally, the AP may transmit the PPDU to a third STA. The PPDU may further include a third data field for the third STA. The third data field may be transmitted in a second RU, which is determined based on the second signal field. The first RU and the second RU are different frequency bands. That is, the third data field indicates that it may be received based on OFDMA.

Hereinafter, in case a third signal field is not included in the PPDU, the embodiment in which the second signal field includes the information on S-TDMA will be described in detail. Additionally, the embodiment in which the PPDU reuses a HE MU PPDU will be described in detail.

For example, the first signal field may include an additional bit indicating whether or not an S-TDMA MU PPDU includes a third signal field, and STF and LTF for a second STA (additional STF and LTF). According to the above-described assumption, the additional bit may indicate that the PPDU does not include the third signal field but include the STF and LTF for the second STA.

The information on RU layout and the information on the number of STAs using the first RU may correspond to an RU allocation subfield being included in a common field of the second signal field. As an 8-bit field, the RU allocation subfield may be assumed to be '01000000'. According to the 8-bit RU allocation subfield shown in Table 9, the '01000000' includes RU layout information on that 106 RU/26 RU/26 RU/26 RU are being used in the whole frequency band (herein, the frequency band is assumed to be 20 MHz). That is, if the RU layout information is 01000000, the whole frequency band may be positioned with one 106 RU and four 26 RUs.

A user field of the second signal field may include a first user field for a first STA and a second user field for a second STA. That is, each of the first user field and the second user field may include the information on S-TDMA.

S-TDMA indication information being included in the first user field may indicate that the first STA is capable of performing S-TDMA. First symbol offset information, which is included in the first user field, may indicate from which point a first data field is being transmitted. That is, the first STA may decode the common field of the second signal field and the first user field so as to know that the first data field is being received in the first RU during the first symbol.

S-TDMA indication information being included in the second user field may indicate that the second STA is capable of performing S-TDMA. Second symbol offset information, which is included in the second user field, may indicate from which point a second data field is being transmitted. That is, the second STA may decode the common field of the second signal field and the second user field so as to know that the second data field is being received in the first RU during the second symbol.

In case of a third STA where the S-TDMA is not applied and only the OFDMA is being applied, the third STA is described as follows. A user field of the second signal field may include a third user field for the third STA. S-TDMA indication information being included in the third user field may indicate that the third STA cannot perform S-TDMA. That is, the third STA may decode the common field of the second signal field and the third user field so as to know that the third data field is received only in the second RU by using a simple OFDMA scheme.

According to the above-described method, by time-dividing one RU and allocating the time-divided RU to multiple STAs, waste of resource may be reduced.

3. Device Configuration

Figure 22:
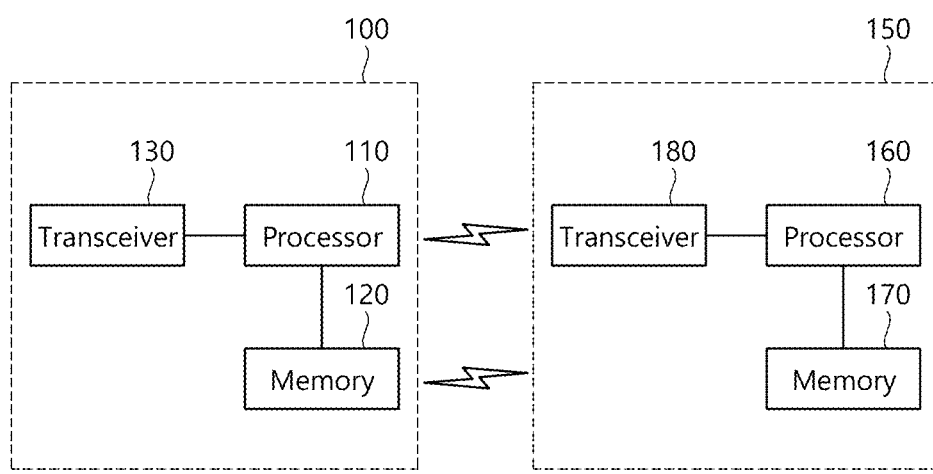
FIG. 22 is a diagram for describing a device for implementing the above-described method.

FIG. 22 is a diagram describing a device for implementing the above-described method.

A wireless device (100) of FIG. 22 may be a transmitting device, which transmits a signal that is described in the description presented above, and a wireless device (150) may be a receiving device, which receives a signal that is described in the description presented above.

The transmitting device (100) may include a processor (110), a memory (120), and a transceiver (130), and the receiving device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Detailed operations of the processor (110) of the transmitting device are as follows. The processor (110) of the transmitting device generates a PPDU for S-TDMA and transmit the PPDU to a first station (STA) and a second STA.

Detailed operations of the processor (160) of the receiving device are as follows. The processor (160) of the receiving device receives the PPDU for S-TDMA and decodes its data field to which the S-TDMA scheme is applied.

Figure 23:
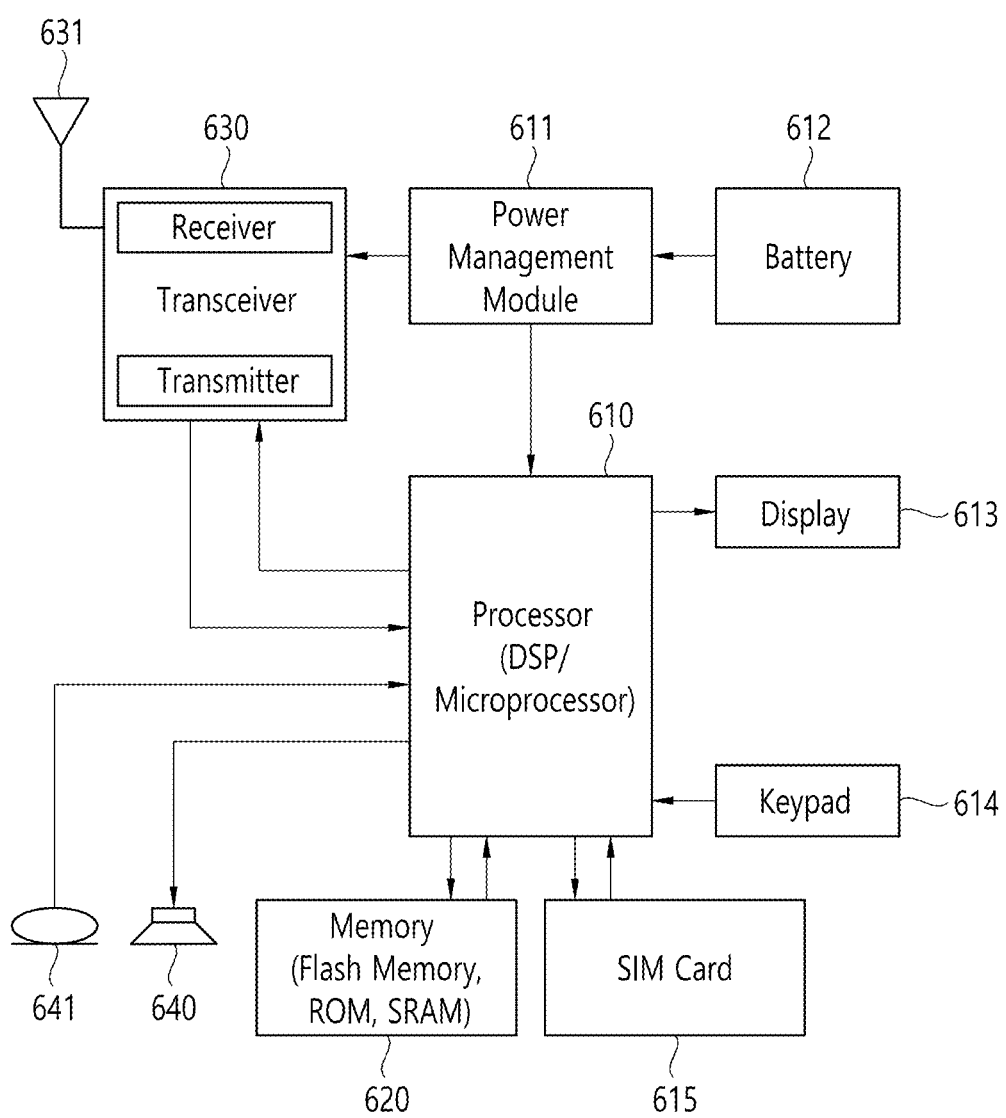
FIG. 23 illustrates a more detailed wireless device for implementing the embodiment of the present disclosure.

FIG. 23 illustrates a more detailed wireless device for implementing the embodiment of the present disclosure.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure that are described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein may be implemented with modules (e.g., procedures, functions, and so on) that perform the functions described herein. The modules may be stored in the memory (620) and executed by the processor (610). The memory (620) may be implemented within the processor (610) or external to the processor (610) in which case those can be communicatively coupled to the processor (610) via various means as is known in the art.

The transceiver (630) is operatively coupled with the processor (610) and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of the transmitting device, the processor (610) generates a PPDU for S-TDMA and transmits the PPDU to a first station (STA) and a second STA.

In case of the receiving device, the processor (610) receives the PPDU for S-TDMA and decodes its data field, which applied the S-TDMA scheme.

The PPDU includes a legacy header field, a first signal field, a second signal field, a first data field for the first STA, and a second data field for the second STA.

The legacy header field may be related to Legacy-Short Training Field (L-STF), Legacy-Long Training Field (L-LTF), Legacy-Signal (L-SIG) field, or Repeated Legacy-Signal (RL-SIG) field, which are included in the HE MU PPDU.

The first signal field may be related to the HE-SIG-A field, which is included in the HE MU PPDU. Since the first signal field is defined for performing S-TDMA operations, this field may be referred to as an S-TDMA SIG-A field.

The second signal field may be related to the HE-SIG-B field, which is included in the HE MU PPDU. Since the second signal field is defined for performing S-TDMA operations, this field may be referred to as an S-TDMA SIG-B field.

The first data field and the second data field may be related to downlink (DL) data, which applies S-TDMA being scheduled to the same RU while considering the time domain.

The second signal field includes information on Resource Unit (RU) layout and information on a number of STAs using the first RU. The information on RU layout and the information on the number of STAs using the first RU may be an 8-bit RU allocation subfield for RU allocation, as shown in Table 9. The information on RU layout and the information on the number of STAs using the first RU may be included in a common field of the second signal field.

That is, the first STA or second STA may decode the second signal field so as to know the RU layout within the whole frequency band and the number of STAs using each RU being included in RU layout. At this point, the number of STAs using the first RU may be equal to 2 or more. This is because S-TDMA is a scheme in which two or more STAs transmit/receive data fields from one RU.

In case a third signal field is further included in the PPDU, the third signal field includes information on the S-TDMA. The information on the S-TDMA includes S-TDMA indication information on that the S-TDMA may be performed, first symbol offset information for the first data field, and second symbol offset information for the second data field. According to the above-described embodiment, a third signal field is additionally inserted in the PPDU, thereby generating an S-TMDA MU PPDU. Since the third signal field is newly defined for performing S-TDMA operations, the third signal field may be referred to as an S-TDMA SIG-C field.

The S-TDMA indication information includes information on that the first and second data fields are being allocated to the first RU. That is, the first STA or the second STA decodes the S-TDMA indication information so as to verify that the first STA or the second STA is using the first RU and that the first STA or the second STA is being allocated with its data field in the first RU via S-TDMA.

The first data field is transmitted in the first RU during a first symbol, which is determined by the first symbol offset information. The second data field is transmitted in the first RU during a second symbol, which is determined by the second symbol offset information.

For example, the first symbol offset information may include information on a transmission start point of the first data field. The second symbol offset information may include information on a transmission start point of the second data field (in case the symbol offset information is a Starting Symbol offset). The first symbol and the second symbol may be positioned by TDMA in the first RU. The second symbol may be positioned immediately after the first symbol. Additionally, the first symbol may be positioned immediately after the second symbol.

As another example, the first symbol offset information may include information on a transmission end point of the first data field. The second symbol offset information may include information on a transmission end point of the second data field (in case the symbol offset information is an Ending Symbol offset). The first symbol and the second symbol may be positioned by TDMA in the first RU. The information on S-TDMA may further include End of S-TDMA information for a data field being last transmitted in the first RU. If the transmission end point of a data field is only known, since it is difficult to determine whether or not a data field is being last transmitted from the corresponding RU, information on that the corresponding data field is being last transmitted may be notified through the End of S-TDMA information by using an additional bit.

In case a third signal field is not included in the PPDU, the second signal field may further include the information on S-TDMA. At this point, the information on RU layout and the information on the number of STAs using the first RU may be included in a common field of the second signal field. The information on S-TDMA may be included in a user field of the second signal field.

The PPDU may further include a Short Training Field (STF) and Long Training Field (LTF) for the first STA and an STF (S-TDMA A-STF) and LTF (S-TDMA A-LTF) for the second STA. That is, not only the STF and LTF for the first STA being allocated in the first RU but also the STF and LTF for the second STA being allocated in the first RU may be added. The STF and LTF for the second STA may be transmitted after the first data field and before the second data field. A guard time may be included between the first data field and the STF and LTF for the second STA.

Additionally, the AP may transmit the PPDU to a third STA. The PPDU may further include a third data field for the third STA. The third data field may be transmitted in a second RU, which is determined based on the second signal field. The first RU and the second RU are different frequency bands. That is, the third data field indicates that it may be received based on OFDMA.

Hereinafter, in case a third signal field is not included in the PPDU, the embodiment in which the second signal field includes the information on S-TDMA will be described in detail. Additionally, the embodiment in which the PPDU reuses a HE MU PPDU will be described in detail.

For example, the first signal field may include an additional bit indicating whether or not an S-TDMA MU PPDU includes a third signal field, and STF and LTF for a second STA (additional STF and LTF). According to the above-described assumption, the additional bit may indicate that the PPDU does not include the third signal field but include the STF and LTF for the second STA.

The information on RU layout and the information on the number of STAs using the first RU may correspond to an RU allocation subfield being included in a common field of the second signal field. As an 8-bit field, the RU allocation subfield may be assumed to be '01000000'. According to the 8-bit RU allocation subfield shown in Table 9, the '01000000' includes RU layout information on that 106 RU/26 RU/26 RU/26 RU are being used in the whole frequency band (herein, the frequency band is assumed to be 20 MHz). That is, if the RU layout information is 01000000, the whole frequency band may be positioned with one 106 RU and four 26 RUs.

A user field of the second signal field may include a first user field for a first STA and a second user field for a second STA. That is, each of the first user field and the second user field may include the information on S-TDMA.

S-TDMA indication information being included in the first user field may indicate that the first STA is capable of performing S-TDMA. First symbol offset information, which is included in the first user field, may indicate from which point a first data field is being transmitted. That is, the first STA may decode the common field of the second signal field and the first user field so as to know that the first data field is being received in the first RU during the first symbol.

S-TDMA indication information being included in the second user field may indicate that the second STA is capable of performing S-TDMA. Second symbol offset information, which is included in the second user field, may indicate from which point a second data field is being transmitted. That is, the second STA may decode the common field of the second signal field and the second user field so as to know that the second data field is being received in the first RU during the second symbol.

In case of a third STA where the S-TDMA is not applied and only the OFDMA is being applied, the third STA is described as follows. A user field of the second signal field may include a third user field for the third STA. S-TDMA indication information being included in the third user field may indicate that the third STA cannot perform S-TDMA. That is, the third STA may decode the common field of the second signal field and the third user field so as to know that the third data field is received only in the second RU by using a simple OFDMA scheme.

According to the above-described method, by time-dividing one RU and allocating the time-divided RU to multiple STAs, waste of resource may be reduced.

What is claimed is:

1. A method for transmitting a Physical layer Protocol Data Unit (PPDU) based on Scheduled-Time Division Multiple Access (S-TDMA) in a wireless LAN system, the method comprising:
generating, by an access point (AP), the PPDU; and
transmitting, by the AP, the PPDU to a first station (STA) and a second STA,
wherein the PPDU includes a legacy header field, a first signal field, a second signal field, a first data field for the first STA, and a second data field for the second STA,
wherein the second signal field includes information on Resource Unit (RU) layout and information on a number of STAs using the first RU,
wherein, in case a third signal field is further included in the PPDU, the third signal field includes information on the S-TDMA,
wherein the information on the S-TDMA includes S-TDMA indication information on that the S-TDMA can be performed, first symbol offset information for the first data field, and second symbol offset information for the second data field,
wherein the S-TDMA indication information includes information on that the first and second data fields are being allocated to the first RU,
wherein the first data field is transmitted in the first RU based on the first symbol offset information,
wherein the second data field is transmitted in the first RU based on the second symbol offset information,
wherein, in case a third signal field is not included in the DL PPDU, the second signal field further includes information on the S-TDMA,
wherein the information on Resource Unit (RU) layout and the information on a number of STAs using the first RU are included in a common field of the second signal field, and
wherein the information on the S-TDMA is included in a user field of the second signal field.

2. The method of claim 1, wherein the first symbol offset information includes information on a transmission start point of the first data field,
wherein the second symbol offset information includes information on a transmission start point of the second data field,
wherein a first symbol being a time duration during which the first data field is transmitted is determined based on the first symbol offset information, wherein a second symbol being a time duration during which the second data field is transmitted is determined based on the second symbol offset information, and wherein the first symbol and the second symbol are positioned in the first RU based on TDMA.

3. The method of claim 1, wherein the first symbol offset information includes information on a transmission end point of the first data field, wherein the second symbol offset information includes information on a transmission end point of the second data field, wherein a first symbol being a time duration during which the first data field is transmitted is determined based on the first symbol offset information, wherein a second symbol being a time duration during which the second data field is transmitted is determined based on the second symbol offset information, wherein the first symbol and the second symbol are positioned in the first RU based on TDMA, and wherein the information on S-TDMA further includes End of S-TDMA information for a data field being last transmitted in the first RU.

4. The method of claim 1, wherein the PPDU further includes a Short Training Field (STF) and Long Training Field (LTF) for the first STA and an STF and LTF for the second STA, wherein the STF and LTF for the second STA are transmitted after the first data field and before the second data field, wherein a guard time is included between the first data field and the STF and LTF for the second STA, and wherein the first signal field includes signaling information notifying whether or not the third signal field and the STF and LTF for the second STA are included in the PPDU.

5. The method of claim 1, further comprising:
transmitting, by the AP, the PPDU to a third STA,
wherein the PPDU further includes a third data field for the third STA,
wherein the third data field is transmitted in a second RU being determined based on the second signal field, and
wherein the first RU and the second RU are different frequency bands.

6. The method of claim 1, wherein the PPDU is generated by using a High Efficiency Multi User PPDU (HE MU PPDU), wherein the legacy header field is related to Legacy-Short Training Field (L-STF), Legacy-Long Training Field (L-LTF), Legacy-Signal (L-SIG) field, or Repeated Legacy-Signal (RL-SIG) field all being included in the HE MU PPDU, wherein the first signal field is related to the HE-SIG-A field being included in the HE MU PPDU, and wherein the second signal field is related to the HE-SIG-B field being included in the HE MU PPDU.

7. The method of claim 1, wherein the number of STAs using the first RU is equal to 2 or more.

8. A wireless device being an access point (AP) for transmitting a Physical layer Protocol Data Unit (PPDU) based on Scheduled-Time Division Multiple Access (S-TDMA) in a wireless LAN system, the wireless device comprising:
a memory;
a transceiver; and
a processor being operatively coupled with the memory and the transceiver, wherein the processor:
generates the PPDU, and
transmits the PPDU to a first station (STA) and a second STA, wherein the PPDU includes a legacy header field, a first signal field, a second signal field, a first data field for the first STA, and a second data field for the second STA, wherein the second signal field includes information on Resource Unit (RU) layout and information on a number of STAs using the first RU, wherein, in case a third signal field is further included in the PPDU, the third signal field includes information on the S-TDMA, wherein the information on the S-TDMA includes S-TDMA indication information on that the S-TDMA can be performed, first symbol offset information for the first data field, and second symbol offset information for the second data field, wherein the S-TDMA indication information includes information on that the first and second data fields are being allocated to the first RU, wherein the first data field is transmitted in the first RU based on the first symbol offset information, wherein the second data field is transmitted in the first RU based on the second symbol offset information, wherein, in case a third signal field is not included in the DL PPDU, the second signal field further includes information on the S-TDMA, wherein the information on Resource Unit (RU) layout and the information on a number of STAs using the first RU are included in a common field of the second signal field, and wherein the information on the S-TDMA is included in a user field of the second signal field.

9. The wireless device of claim 8, wherein the first symbol offset information includes information on a transmission start point of the first data field, wherein the second symbol offset information includes information on a transmission start point of the second data field, wherein a first symbol being a time duration during which the first data field is transmitted is determined based on the first symbol offset information, wherein a second symbol being a time duration during which the second data field is transmitted is determined based on the second symbol offset information, and wherein the first symbol and the second symbol are positioned in the first RU based on TDMA.

10. The wireless device of claim 8, wherein the first symbol offset information includes information on a transmission end point of the first data field, wherein the second symbol offset information includes information on a transmission end point of the second data field, wherein a first symbol being a time duration during which the first data field is transmitted is determined based on the first symbol offset information, wherein a second symbol being a time duration during which the second data field is transmitted is determined based on the second symbol offset information, wherein the first symbol and the second symbol are positioned in the first RU based on TDMA, and wherein the information on S-TDMA further includes End of S-TDMA information for a data field being last transmitted in the first RU.

11. The wireless device of claim 8, wherein the PPDU further includes a Short Training Field (STF) and Long Training Field (LTF) for the first STA and an STF and LTF for the second STA,
   wherein the STF and LTF for the second STA are transmitted after the first data field and before the second data field,
   wherein a guard time is included between the first data field and the STF and LTF for the second STA, and
   wherein the first signal field includes signaling information notifying whether or not the third signal field and the STF and LTF for the second STA are included in the PPDU.

12. The wireless device of claim 8, wherein the processor transmits the PPDU to a third STA,
   wherein the PPDU further includes a third data field for the third STA,
   wherein the third data field is transmitted in a second RU being determined based on the second signal field, and
   wherein the first RU and the second RU are different frequency bands.

13. The wireless device of claim 8, wherein the PPDU is generated by using a High Efficiency Multi User PPDU (HE MU PPDU),
   wherein the legacy header field is related to Legacy-Short Training Field (L-STF), Legacy-Long Training Field (L-LTF), Legacy-Signal (L-SIG) field, or Repeated Legacy-Signal (RL-SIG) field all being included in the HE MU PPDU,
   wherein the first signal field is related to the HE-SIG-A field being included in the HE MU PPDU, and
   wherein the second signal field is related to the HE-SIG-B field being included in the HE MU PPDU.

14. The wireless device of claim 8, wherein the number of STAs using the first RU is equal to 2 or more.

15. A method for receiving a Physical layer Protocol Data Unit (PPDU) based on Scheduled-Time Division Multiple Access (S-TDMA) in a wireless LAN system, the method comprising:
   receiving, by a first station (STA), the PPDU from an access point (AP), wherein the PPDU includes a first data field for the first STA and a second data field for the second STA; and
   decoding, by the first STA, the first data field,
   wherein the PPDU includes a legacy header field, a first signal field, and a second signal field,
   wherein the second signal field includes information on Resource Unit (RU) layout and information on a number of STAs using the first RU,
   wherein, in case a third signal field is further included in the PPDU, the third signal field includes information on the S-TDMA,
   wherein the information on the S-TDMA includes S-TDMA indication information on that the S-TDMA can be performed, first symbol offset information for the first data field, and second symbol offset information for the second data field,
   wherein the S-TDMA indication information includes information on that the first and second data fields are being allocated to the first RU,
   wherein the first data field is transmitted in the first RU based on the first symbol offset information,
   wherein the second data field is transmitted in the first RU based on the second symbol offset information,
   wherein, in case a third signal field is not included in the DL PPDU, the second signal field further includes information on the S-TDMA,
   wherein the information on Resource Unit (RU) layout and the information on a number of STAs using the first RU are included in a common field of the second signal field, and
   wherein the information on the S-TDMA is included in a user field of the second signal field.

* * * * *